(12) United States Patent
Mendelson et al.

(10) Patent No.: US 9,762,574 B2
(45) Date of Patent: Sep. 12, 2017

(54) TECHNIQUES FOR PROVIDING SOFTWARE SUPPORT FOR A HARDWARE COMPONENT OF A COMPUTING DEVICE

(71) Applicant: INTEL CORPORATION, Santa Clara, CA (US)

(72) Inventors: Tsippy Mendelson, Modiin (IL); Vitaly Lubart, Jerusalem (IL); Suman Sharma, San Jose, CA (US); Narm Gadiraju, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 43 days.

(21) Appl. No.: 14/583,305

(22) Filed: Dec. 26, 2014

(65) Prior Publication Data

US 2016/0191333 A1    Jun. 30, 2016

(51) Int. Cl.
*G06F 7/04* (2006.01)
*H04L 29/06* (2006.01)
*G06F 21/85* (2013.01)

(52) U.S. Cl.
CPC .......... *H04L 63/0861* (2013.01); *G06F 21/85* (2013.01)

(58) Field of Classification Search
CPC ..... H04L 41/14; H04L 63/0861; H04L 67/16; G06F 21/31; G06F 21/32
USPC .......................................................... 726/7
See application file for complete search history.

(56) References Cited

U.S. PATENT DOCUMENTS

| | | | | |
|---|---|---|---|---|
| 7,813,910 | B1* | 10/2010 | Poulin ................. | G06F 11/3457 703/13 |
| 7,849,497 | B1* | 12/2010 | Hurst ..................... | H04L 41/12 713/153 |
| 2004/0122645 | A1* | 6/2004 | Shevenell ............... | H04L 43/50 703/21 |
| 2008/0080536 | A1* | 4/2008 | Chhaya ................. | H04L 41/145 370/401 |
| 2016/0277202 | A1* | 9/2016 | Davis .................... | H04L 12/282 |

* cited by examiner

*Primary Examiner* — Mohammad W Reza

(57) ABSTRACT

Various embodiments are generally directed to techniques to provide software support for a hardware component incorporated into a computing device with a variety of processor components supporting different instruction sets and with a variety of operating systems. An apparatus may include a main processor component of a computing device; a network device simulator coupled to a hardware component of the computing device, and to provide a simulated network device; and a bus network interface controller (NIC) simulator to provide a simulated bus NIC, the bus NIC simulator and the network device simulator to present the hardware component to the main processor component as the simulated network device accessible to the main processor component through at least the simulated bus NIC and a simulated network that couples the simulated bus NIC to the simulated network device. Other embodiments are described and claimed.

24 Claims, 10 Drawing Sheets

1000

US 9,762,574 B2

TECHNIQUES FOR PROVIDING SOFTWARE SUPPORT FOR A HARDWARE COMPONENT OF A COMPUTING DEVICE

BACKGROUND

As technological advances make possible the addition of ever more hardware features to computing devices, issues arise as to how to provide software support for the use of those features. As computing devices adopt an increasing variety of physical configurations and are employed in an increasing variety of applications, numerous new series of processor components have been developed and become prevalent. Fortunately, coupling such new processor components to other circuits to build computing devices has frequently been aided by continuing industry efforts to develop, maintain and update specifications for buses, allowing particular bus specifications to be widely adopted and used, even among computing devices designed to meet very different requirements.

However, many of such new series of processor components are often somewhat specialized to meet the needs of very different applications, often leading to new processor components having new instruction sets that are incompatible with each other and earlier processor components. This has encouraged the development of a widening variety of new operating systems and/or new versions of older operating systems. Thus, development of new hardware features frequently needs to be accompanied by development of software support for an increasing number of combinations of operating systems and instruction sets, and this imposes a burden that has been known to delay the introduction of new hardware features.

DETAILED DESCRIPTION

Figure 1:
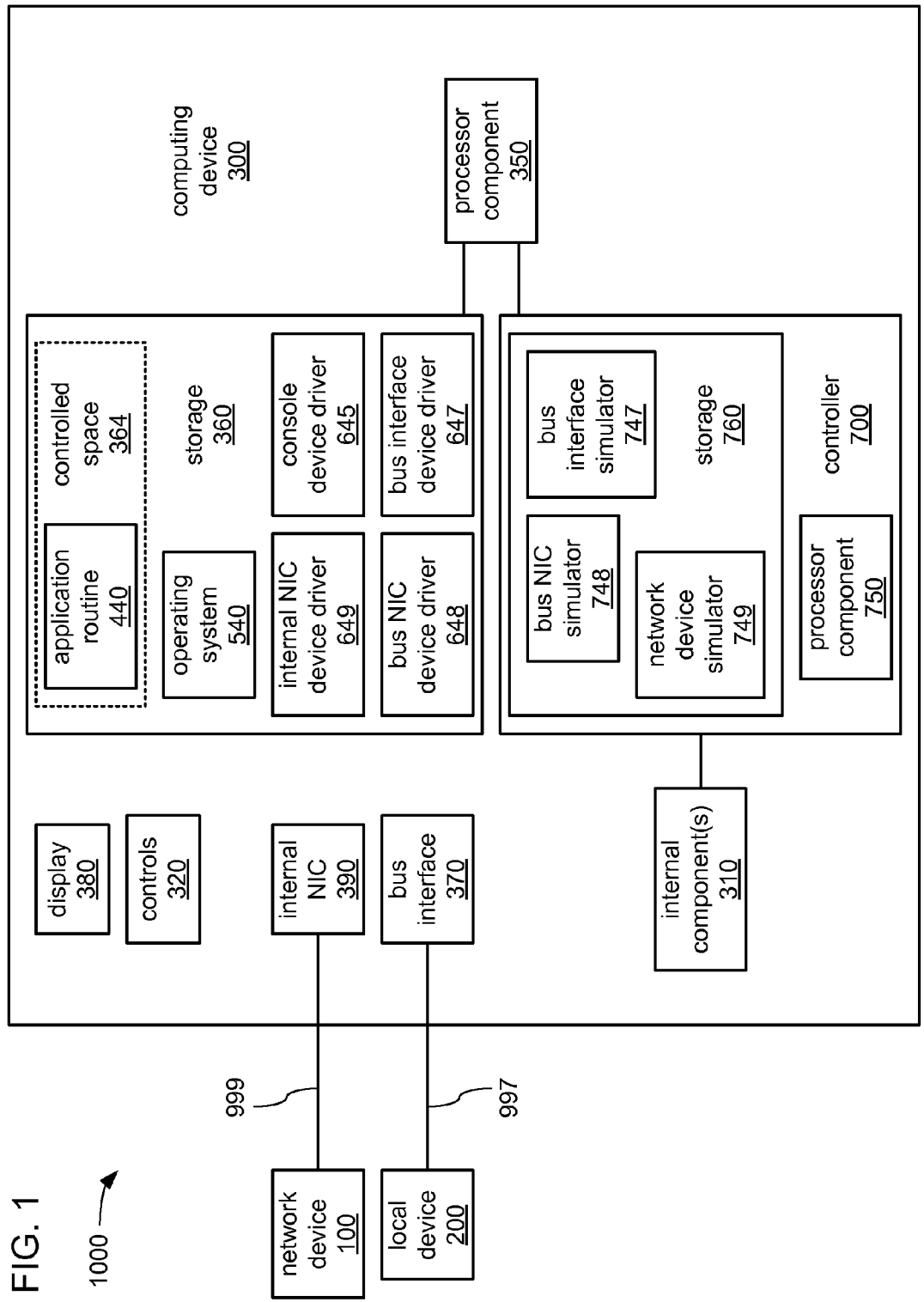
FIG. 1 illustrates an example embodiment of a processing system.

Various embodiments are generally directed to techniques to provide software support for a hardware component incorporated into a computing device with a variety of processor components supporting different instruction sets and with a variety of operating systems. Advantage may be taken of a high likelihood that device drivers to support a widely used peripheral bus that supports the attachment of a network interface controller (NIC) to a computing device therethrough will be included with an operating system for execution within that computing device. In so doing, the hardware component may be provided with an interface that causes the hardware component to appear, from the perspective of the processor component in executing the operating system, to be remotely coupled to the computing device via a network. A combination of a bus interface coupling the computing device to a peripheral bus, a NIC coupled to that peripheral bus and/or a network coupling the hardware component as a network device to that NIC may be simulated to cause the hardware component to so appear to be such a network device. The hardware component may be made accessible to an application routine executed within the computing device via a network protocol, and such access may enable the formation of a secure pipeline between the application routine and the hardware component.

As recognizable to those skilled in the art, it is commonplace for computing devices to employ at least one peripheral bus that enjoys wide use in industry to couple peripheral devices to computing devices. Such buses have included RS-232C currently promulgated by the Telecommunications Industries Association (TIA) of Arlington, Va., and IEEE-1284 promulgated by the Institute of Electrical and Electronics Engineers (IEEE) Standards Association of Piscataway, N.J. Each of these peripheral buses, and others like them, were at one time so widely used that support for these peripheral buses, including device drivers, could often be relied upon to be included with core components of operating systems. As also recognizable to those skilled in the art, it is commonplace for such widely used buses to become widely associated with coupling one or more particular peripherals to a computing device such that support for using these peripheral buses with those particular peripherals, including device drivers, could also often be relied upon to be included with core components of operating systems. For example, RS-232C became widely associated with coupling of inkjet plotters and modems to computing devices, and IEEE-1284 became widely associated with coupling dot-matrix printers and then laser printers to computing devices.

More recently, such buses include Universal Serial Bus (USB) currently promulgated by the USB™ Implementer's Forum, Inc. of Beaverton, Oreg. Although USB was originally associated largely with user input devices (e.g., mice, keyboards, touchpads, etc.) and storage devices (e.g., the so-called "thumb drive"), USB has since become commonly used to couple NICs to computing devices. By way of example, it has become commonplace to provide "smart" televisions, routers and mobile devices with USB interfaces and to support the attachment of NICs that support wireless networking to those devices. In support of such use of USB to couple a NIC to a computing device, a specification for the protocol between the computing device and the NIC referred as the Remote Network Driver Interface Specification (RNDIS), and promulgated by Microsoft Corporation of Redmond, Wash. was introduced and has become widely adopted.

To enable software support, including device drivers, for a hardware component to be offered within a computing device with support across a wide range of operating systems, but without the need to create the device drivers to specifically support that hardware component across that wide range of operating systems, the hardware component may be provided with an interface to other components of the computing device that simulates an interface of the computing device to a widely used peripheral bus and/or a peripheral device that is often coupled to computing devices via that widely used peripheral bus. More specifically, such an interface provided to the hardware component may simulate the behavior on that peripheral bus that would be expected of a NIC coupled to the computing device through that peripheral bus. The choice of simulating a NIC may be made in response to the particular peripheral bus often being employed to couple a NIC to a computing device, and as earlier discussed, such use of USB has indeed become commonplace. Alternatively or additionally, the choice of emulating a NIC may be deemed desirable to make use of an ability to use particular secure protocols in communications between a NIC and other components of a computing device such that a measure of security may be provided to data exchanged with the hardware component.

Also more specifically, such an interface provided to the hardware component may simulate the behavior of a form of bus interface logic (e.g., an integrated circuit (IC) that provides an interface to a peripheral bus) that is widely used in providing an interface to a particular peripheral bus to which a NIC might be expected to be coupled. As recognizable to those skilled in the art, it is commonplace for particular pieces of interface logic to become widely used to provide computing devices with an interface to a particular bus. By way of example, circuitry to provide a computing device with an interface to USB has been provided by Intel Corporation of Santa Clara, Calif. for some time, and has become widely used. Thus, in embodiments in which it is deemed desirable to provide the hardware component with an interface that simulates a NIC, it may accordingly be deemed desirable for that interface to also simulate an interface controller that provides an interface to USB, and for that interface to more specifically simulate a USB interface controller offered by Intel Corporation.

The interface provided to the hardware device to provide such simulations may, in some embodiments, be implemented as a controller based on a processor component that executes one or more routines to simulate an interface controller providing an interface of the computing device to a peripheral bus (e.g., USB) and/or to simulate a peripheral device on that peripheral bus (e.g., a NIC). In other embodiments, such simulations may be provided using hardware-based digital logic such as one or more programmable logic devices (PLDs), a portion of a chipset to support a processor component, a portion of a processor component, etc. In still other embodiments in which a portion of the computing device includes a bus interface that actually provides the computing device with an interface to a peripheral bus, then the hardware component may be coupled to that peripheral bus within the computing device, thereby obviating the need to simulate that bus interface. Instead, the hardware component could be provided with an interface that simulates a peripheral device on that bus (e.g., a NIC).

In embodiments in which a NIC coupled to a peripheral bus is simulated by the interface provided to the hardware component, one or more network routines may form a secure pipeline using any of a variety of network security protocols to provide a secure channel between an application and the hardware component. In some embodiments, the application may be executed within an operating environment provided by the processor component and the operating system that includes a controlled space within the address space of storage of the computing device. The controlled space may be subject to access restrictions that limit the ability of the application routine to access other portions of the computing device, including other routines. It may be that among the limited access afforded to the application routine may be access to network applications programming interface (API) that forms part of a pathway by which the application routine may be able to access a NIC simulated by the interface provided to the hardware component.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of an embodiment of a processing system 1000 incorporating one or more of a network device 100, a local device 200 and a computing device 300. The computing device 300 may exchange data with either of the network device 100 or the local device 200. Each of these devices 100, 200 and 300 may be any of a variety of types of computing device, including without limitation, a desktop computer system, a data entry terminal, a laptop computer, a netbook computer, a tablet computer, a handheld personal data assistant, a smartphone, smart glasses, a smart wristwatch, a digital camera, a smart card incorporating a processor component, a body-worn computing device incorporated into clothing, a computing device integrated into a vehicle (e.g., a car, a bicycle, a wheelchair, etc.), a server, a cluster of servers, a server farm, etc.

As depicted and discussed, at least the computing devices 100 and 300 may exchange signals conveying data, and such exchanges may occur through a network 999. In various embodiments, at least the network 999 may be a single network possibly limited to extending within a single building or other relatively limited area, a combination of connected networks possibly extending a considerable distance, and/or may include the Internet. Thus, at least the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

In various embodiments, the computing device 300 may incorporate one or more of a processor component 350, a storage 360, one or more internal components 310, controls 320, a display 380, a bus interface 370 to couple the computing device 300 to a peripheral bus 997, and an internal NIC 390 to couple the computing device 300 to the network 999. The storage 360 may store one or more of an application routine 440, an operating system 540, a console device driver 645, a bus interface device driver 647, a bus NIC device driver 648 and an internal NIC device driver 649. Each of the application routine 340, the operating system 540, the console device driver 645, the bus interface device driver 647, the bus NIC device driver 648 and the internal NIC device driver 649 may incorporate a sequence of instructions operative on the processor component 350 in its role as a main processor component of the computing device 300 to implement logic to perform various functions. In some embodiments, the computing device 300 may additionally incorporate a controller 700. In such embodiments, the controller 700 may incorporate one or both of a processor component 750 and a storage 760. The storage 760 may store one or more of a bus interface simulator 747, a bus NIC simulator 748 and a networked device simulator 749. Each of the bus interface simulator 747, the bus NIC simulator 748 and the network device simulator 749 may incorporate a sequence of instructions operative on the processor component 750 in its role as a controller processor component of the controller 700 to implement logic to perform various functions.

The controls 320 may be any of a variety of types of manually operable input device, including and not limited to a keyboard, mouse, touchpad, etc. The display 380 may be any of a variety of display device based on any of a variety of technologies to visually present text, graphical imagery, photography, etc. Together, the controls 320 and the display 380 may be operable to provide a user interface to an operator of the device 300.

The bus interface 370 may be implemented with any of a variety of types of hardware-based logic to originate and/or provide an interface to the peripheral bus 997. Through the peripheral bus 997, the bus interface 370 may provide the processor component 350 with access to one or more other devices such as the local device 200. Similarly, the internal NIC 390 may be implemented with any of a variety of types of hardware-based logic to originate and/or provide an interface to the network 999. Through the network 999, the bus interface 370 may provide the processor component 350 with access to one or more other devices such as the network device 100. Such hardware logic as may be used to implement the bus interface 370 and/or the internal NIC 390 may be incorporated into a support IC that may be coupled to the processor component 350 to provide various support functions, thereto.

The computing device 300 may be operated to cause execution of at least one application routine 440 to perform any of a variety of tasks. The application routine 440 may be any of a variety of types of application, including and not limited to, word processors, spreadsheet editors, CAD/CAM software, website browsers, audio/visual recording and/or playback software, photograph editors, etc. Execution of the application routines 440 may cause the processor component 350 to operate the controls 320 and/or the display 380 to provide a user interface for an operator of the computing device 300. Alternatively or additionally, execution of the application routine 440 may cause the processor component 350 to operate the bus interface 370 and/or the internal NIC 390 to exchange data with one or both of the network device 100 and the local device 200. Also alternatively or additionally, execution of the application routine 440 may cause the processor component 350 to access the one or more internal components 310.

As part of enabling such execution of at least one application routine 440, the computing device 300 may also be operated to cause execution of the operating system 540. The operating system 540 may be any of a variety of types of operating system that cooperates with at least the processor component 350 of the computing device to provide an operating environment to support execution of various routines, including the application routine 440. Among such support may be the division of addressable storage space within the storage 360 into one or more address spaces that are assigned various access permissions to prevent various forms of improper access by one routine into storage locations associated with another routine. More specifically, and as depicted, the operating system 540 may instantiate a controlled space 364 within which portions of the application routine 440 and/or data associated therewith may be stored and executed by the processor component 350 with particular permissions. Those particular permissions may limit the degree to which instructions of the application routine 440 may cause the processor component 350 to access other routines, data associated with other routines, and/or hardware components of the computing device 300. Alternatively or additionally, those particular permissions may similarly limit the degree to which instructions of another routine may cause the processor component 350 to access the application routine 440 and/or other items stored within the controlled space 364.

The computing device 300 may be further operated to cause execution of one or more device drivers that may extend the functionality of that operating system 540 to take advantage of one or more components of the computing device 300 and/or other device(s) that may be coupled to the computing device 300 (e.g., the network device 100 and/or the local device 200). By way of example, in embodiments of the computing device 300 that incorporate one or both of the controls 320 and the display 380, the console device driver 645 associated with the controls 320 and/or the display 380 may be included in the storage 360 to augment the operating system 540 with the ability to access and operate the controls 320 and/or the display 380 to provide a user interface. The operating system 540 may provide at least a portion of a console API to the application routine 440 to enable the application routine 440 to make console API calls to receive manual input by an operator of the computing device 300 via the controls 320 and/or to visually present text, graphics and/or images on the display 380. As familiar to those skilled in the art, the operating system 540 may implement logic to convert between the console API calls made by the application routine 440 and device driver interface calls made by the operating system 540 to the console device driver 645. Stated differently, the application routine 440 may interact with the controls 320 and/or the display 380 through both the operating system 540 and the console device driver 645.

In embodiments of the computing device 300 that incorporate the internal NIC 390, the internal NIC device driver 649 associated with the internal NIC 390 may be included in the storage 360 to augment the operating system 540 with the ability to access and operate the internal NIC 390 to communicate with other devices (e.g., the network device 100) via a network (e.g., the network 999). The operating system 540 may provide at least a portion of a network API to the application routine 440 to enable the application routine 440 to make network API calls to operate one or more NICs to access a network through the one or more NICs. As will be explained in greater detail, in embodiments in which there is more than one NIC, the operating system 540 may analyze various aspects of the network activity that the application routine 440 engages in and aspects of the network coupled to each NIC to select an appropriate one of the NICs. Presuming that the operating system 540 selects the internal NIC 390, then the operating system 540 may convert between the network API calls made by the application routine 440 and device driver interface calls made by the operating system 540 to the internal NIC device driver 649. Stated differently, and presuming that the operating system 540 selects the internal NIC 390, the application routine 440 may be caused by the operating system to interact with the internal NIC 390 through both the operating system 540 and the internal NIC device driver 649.

As familiar to those skilled in the art, it is not uncommon for different versions of a particular hardware component of a computing device offered by different vendors to include interfaces to other components in the computing device that are designed differently. For example, the interfaces of different versions of a hardware component from different vendors may employ different register sets in which bits with similar functions are distributed differently and/or encode various settings differently. Alternatively or additionally, the interfaces of different versions may provide data buffers of differing sizes and/or with differing protocols to add another piece of data thereto and/or to retrieve a piece of data therefrom. Also alternatively or additionally, an interface of one of the different versions may be more reliant on interrupts to interact with a processor component of a computing device, while an interface of another of the different versions may be more reliant on polling by a processor component. Still also alternatively or additionally, the interfaces of different versions may make their registers and/or data buffers accessible to a processor component of a computing device at differing addresses or sets of addresses. As a result of these and other differences in interfaces of different versions of a hardware component, each such version may need to be supported with a different device driver. Thus, for example, different versions of the internal NIC device driver 649 may need to be developed by each vendor of a different version of the internal NIC 390.

In embodiments of the computing device 300 that incorporate the bus interface 370, the bus interface device driver 647 associated with the bus interface 370 may be included in the storage 360 to augment the operating system 540 with the ability to access and operate the bus interface 370 to communicate with devices locally coupled to the computing device 300 via a peripheral bus (e.g., the local device 200 via the peripheral bus 997). The operating system 540 may provide at least a portion of an API to the application routine 440 to enable the application routine 440 to make API calls to access a peripheral bus through one or more bus interfaces. The operating system 540 may convert between the API calls made by the application routine 440 and device driver interface calls made by the operating system 540 to the bus interface device driver 647. Stated differently, the application routine 440 may be caused by the operating system to interact with the bus interface 370 through both the operating system 540 and the bus interface device driver 647.

However, to make use of the local device 200 coupled to the computing device 300 via the peripheral bus 997, a device driver associated with the local device 200 may also need to be included in the storage 360 (in addition to the bus interface device driver 647) to augment the operating system 540 with the ability to access and operate the local device 200. By way of example, where the local device 200 is a bus NIC designed to be coupled to a computing device (such as the computing device 300) via a peripheral bus (such as the peripheral bus 997), then the bus NIC device driver 648 associated with that example of the local device 200 may be included in the storage 360 to augment the operating system 540 with the ability to access and operate the local device 200 through the access provided to the operating system 540 by the bus interface device driver 647. Again, the operating system 540 may provide at least a portion of a network API to the application routine 440 to enable the application routine 440 to make network API calls to operate one or more NICs (e.g., one or both of the internal NIC 390 and the local device 200) to access a network through the one or more NICs. Also again, the operating system 540 may analyze various aspects of the network activity that the application routine 440 engages in and aspects of the network coupled to each NIC to select an appropriate one of the NICs. Presuming that the operating system 540 selects the local device 200 as the NIC to use, then the operating system 540 may convert between the network API calls made by the application routine 440 and device driver interface calls made by the operating system 540 to the bus NIC device driver 648. Stated differently, and presuming that the operating system 540 selects the local device 200 as the NIC to use, the application routine 440 may be caused by the operating system to interact with the local device 200 through the operating system 540 and through both of the bus NIC device driver 648 and the bus interface device driver 647.

Thus, as exemplified in the above discussion, various hardware components either incorporated into and/or otherwise coupled to the computing device 300 may require support software to be created specifically for those hardware components and matched to the particular combination of the processor component 350 and the operating system 540 of the computing device 300 to become operable with the operating system 540, and thereby, to become accessible to the application routine 440. More specifically, device drivers (e.g., the device drivers 645, 647 and/or 649) may be needed to provide support for various hardware components incorporated into the computing device 300 (e.g., corresponding ones of the controls 320, the display 380, the internal NIC 390 and/or the bus interface 370). Further, for each such hardware component, multiple versions of each of those device drivers may need to be created for every possible combination of different types of the processor component 350 and different types of the operating system 540. As previously discussed, the need to generate so many different versions of device driver for a new hardware device can slow the introduction and use of that new hardware device.

The one or more internal components 310 may include any of a wide variety of hardware components that may be incorporated into the computing device 300. By way of example, the internal device(s) 310 may include support components to monitor and/or assist the processor component 350 in performing various functions, including and not limited to, a temperature and/or other sensor(s) to monitor the condition of the processor component 350, logging and/or analysis component(s) coupled to or embedded within the processor component 350 to monitor its execution of instructions, any of a variety of types of audio and/or visual components to record and/or play back portions of multimedia presentations, and/or any of a variety of device(s) to receive and/or record any of a variety of biometric or other information needed to control access to the computing device 300.

Regardless of what each of the internal device(s) 310 may be or how many there may be, the need for the one or more internal devices 310 to be supported with multiple device drivers specifically created for each possible combination of type of processor component 350 and type of operating system 540 may be avoided by providing the internal device(s) 310 with an interface that simulates other hardware component(s) for which device drivers may already be readily available to the computing device 300 if not already stored within the storage 360. By way of example, and as already discussed, the internal device(s) 310 may be coupled to other components of the computing device 300, including the processor component 350, through an interface that simulates a combination of a bus interface, a bus NIC coupled to that bus interface through a peripheral bus, and a network device coupled to that bus NIC through a network. More specifically, the controller 700 may provide such an interface between the internal device(s) 310 and the processor component 350, and within the controller 700, the processor component 750 may execute one or more routines to provide such simulations. Through such a combination of simulations, the identity and/or functionality of the internal device(s) 310 may essentially be disguised from the processor component 350 to enable device drivers intended for use with entirely different components to be used with the internal device(s) 310 instead of developing device drivers specifically for the internal device(s) 310.

The processor component 750 of the controller 700 may execute the bus interface simulator 747 to present the processor component 350 of the computing device 300 with a simulation of a bus interface that may be in addition to the bus interface 370. Due to the currently widespread use of USB generally and/or due to the widespread use of USB as a peripheral bus by which a NIC may be coupled to a computing device, one or both of the bus interface 370 and the bus interface simulated by the bus interface simulator 747 may be USB bus interfaces. Such a simulation of a USB bus interface by the bus interface simulator 747 may be configured to simulate the presence of any of a variety of known USB bus interface components such as a separate USB bus interface IC or a block of digital logic for a USB bus interface that may be added to the design of a larger IC. It may be deemed likely that, regardless of which known USB bus interface the bus interface simulator 747 is configured to simulate, the currently high prevalence of USB should ensure that an appropriate version of the bus interface device driver 647 will be available to support that simulation just as if it were a real USB bus interface, and for any of a variety of combinations of type of processor component 350 and type of operating system 540. However, it may be deemed desirable for the sake of simplicity to configure the bus interface simulator 747 to simulate a USB bus interface that has a register set, data buffers and/or other interface characteristics that are substantially similar to that of the bus interface 370. This may enable the same version of the bus interface device driver 647 to be used to support both the bus interface 370 and the bus interface simulated by the bus interface simulator 747.

The processor component 750 of the controller 700 may also execute the bus NIC simulator 748 to present the processor component 350 of the computing device 300 with a simulation of the presence of a bus NIC coupled to the bus interface that is simulated by the bus interface simulator 747. Due, again, to the currently widespread use of USB generally and/or due to the widespread use of USB as a peripheral bus by which a NIC may be coupled to a computing device, and also due to the growing acceptance of the RNDIS specification for implementing a NIC that couples to computing devices via USB, the bus NIC simulator 748 may be configured to simulate a USB bus NIC that conforms to the RNDIS specification. Correspondingly, the bus NIC device driver 648 may be a device driver meant to provide software support for a USB bus NIC that conforms to the RNDIS specification. Doing so may be deemed likely to ensure that an appropriate version of the bus NIC device driver 648 will be available to support that simulation just like a real USB bus NIC that conforms to the RNDIS specification and for any of a variety of combinations of type of processor component 350 and type of operating system 540. It should be noted that since the behavior of a real USB bus NIC would be visible to the processor component 350 to only a limited extent as a result of being accessible to the processor component 350 only through a USB bus interface, the bus NIC simulator 748 may not need to simulate every aspect of the behavior of a USB bus NIC. Stated differently, the bus NIC simulator 748 may need to simulate only enough of the behavior expected of a USB bus NIC to cause the bus interface simulator 747 to behave from the perspective of the processor component 350 in a manner consistent with being a USB bus interface to which a USB bus NIC has been coupled via USB.

As part of executing at least the bus interface simulator 747 and/or the bus NIC simulator 748 to provide simulations of a bus interface and/or a bus NIC, the processor component 750 may simulate various configuration registers of one or both of these simulated components/devices that may be expected in real versions of these components/devices to provide identifying information specifying a vendor and/or device identification code. Alternatively or additionally, the processor component 750 may respond to queries made by one or more routines executed by the processor component 350 (e.g., a portion of the operating system 540) towards these simulated components/devices in a manner consistent with how real versions of these components/devices would respond to allow those routines to perform various tests to identify what components/devices these simulations are meant to simulate. As familiar to those skilled in the art, an operating system or other routine may make such queries and/or retrieve values from such registers to determine what device drivers and/or other support routines should be loaded and executed.

Further, there may be routines executed by the processor component 350 of the operating system 540 or other routines that may scan networks to which NICs of the computing device 300 are coupled to attempt to identify network devices that may be present, at least within the segment of each network to which the computing device 300 is coupled. In response to such network queries, the processor component 350, in providing a simulation of a network device, may provide information identifying the simulated network device as present on the simulated network such that the simulated network device is also detected. Although this may not cause a device driver to be loaded and executed for the simulated network device by the processor component 350, it may still be relayed to one or more routines, such as the application routine 440 in some embodiments. Thus, by presenting the main processor component 350 with sufficiently complete simulations of these components/devices that includes appropriate responses to reading of configuration registers and/or other forms of queries for identifying information, the controller processor component 750 may ensure that the correct device drivers are loaded and executed by the main processor component 350 (and/or other actions are taken by the processor component 350) to enable proper use of the simulated components/devices by the operating system 540, and ultimately, by the application routine 340.

The processor component 750 of the controller 700 may further execute the network device simulator 749 to present the processor component 350 of the computing device 300 with a simulation of the presence of a network device on a network coupled to the bus NIC that is simulated by the bus NIC simulator 748. Again, the processor component 350 is presented with access to the simulated bus NIC through a simulation of a bus interface by the bus interface simulator 747. The network device simulator 749 may essentially disguise the internal component(s) 310 as a network device to which the combination of the simulated bus interface and the simulated bus NIC appear to provide access for the processor component 350.

In various embodiments, the network device simulator 749 may be configured to simulate a network device that communicates using any of a variety of known and widely used network protocols, including and not limited to, Hypertext Transfer Protocol (HTTP), secure HTTP (HTTPS), File Transfer Protocol (FTP), telnet, etc. Thus, the exact type of network device simulated by the network device simulator 749 may be any of a variety of types of network device from a relatively complex web server presenting a website of multiple webpages to a relatively simple network drive. However, the type of network device that is simulated, and accordingly, what network protocol(s) are used by that simulated network device may be at least partly determined by what function(s) and/or the complexity of the function(s) performed by the internal component(s) 310.

In some embodiments, the application routine 440 may interact with internal component(s) 310 by interacting with the simulated network device provided by the network device simulator 749 as if that simulated network device were a real network device. More specifically, the application routine 440 may engage in communications with that simulated network device using whatever network protocol(s) are supported by that simulated network device. In so doing, the application routine 440 may employ the network API calls of a network API that may be provided to the application routine 440 by the operating system 540.

It may be deemed desirable to limit the extent of the software support required for the internal component(s) 310 to the application routine 440. As familiar to those skilled in the art, the writing of device drivers typically requires more extensive knowledge that is more specific to each operating system and/or each processor component of each possible combination of operating system and processor component for which a device driver may need to be created. In particular, at least portions of device drivers often need to be written in the machine or assembly language native to each processor component. In contrast, application routines tend to be able to be written in higher level languages that are far less coupled to the specific processor component that may ultimately execute the application routine. Also, there may be some degree of commonality to the API calls and/or other types of function calls that may need to be used by an application routine across multiple operating systems. In some cases, differences that do exist may be relegated to library portions of an application routine, thereby easing the effort of creating different versions of the application routine for use with different combinations of processor component and operating system. Stated more simply, through the use of simulations of other hardware components to enable the use of device drivers meant for those other components, the effort to provide software support for the internal component(s) 310 may be limited to creating different versions of the application routine 440, which may be an easier effort than creating different versions of device drivers specifically meant for use with the internal component(s) 310.

It should be noted that the controller 700 may, in addition to providing the simulations of hardware components that have been described, also provide various other functions in support of the operation of computing device 300. More specifically, in various embodiments, the processor component 750 of the controller 700 may recurringly monitor various aspects of the operation of the computing device 300 to detect instances of malfunctions, including instances of a "system hang" in which the state of execution of the operating system 540 by the processor component 350 is such that the processor component 750 responds by resetting at least a portion of the computing device 300.

Figure 2:
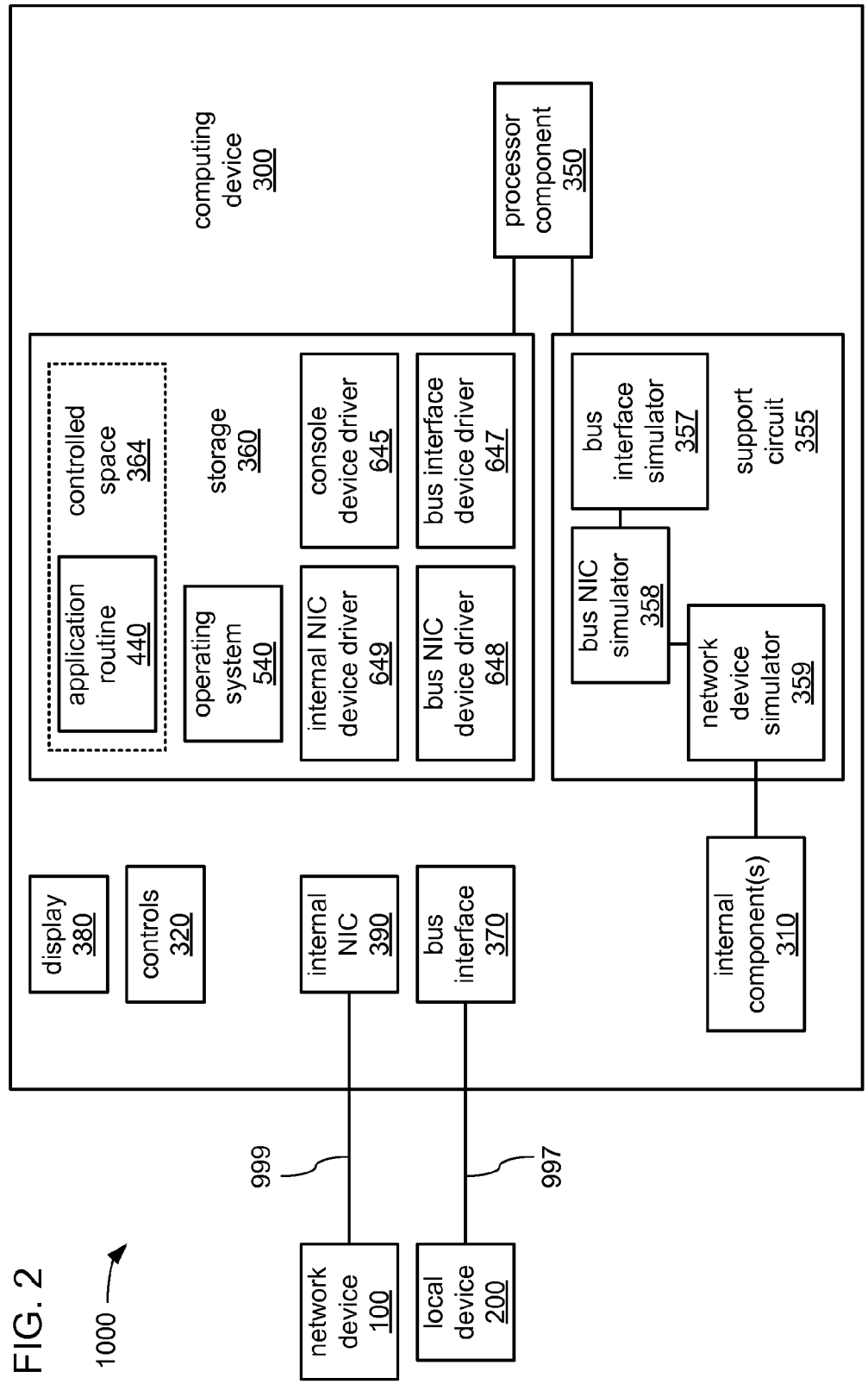
FIG. 2 illustrates an alternate example embodiment of a processing system.

FIG. 2 illustrates a block diagram of an alternate embodiment of the processing system 1000. Instead of the controller 700 of FIG. 1 serving as the interface for the internal component(s) 310 to present simulations of multiple devices to the processor component 350, in FIG. 2, a support logic circuit 355 serves as that interface. In some embodiments, the support logic circuit 355 may be a component of a chipset that couples the processor component 350 to other components of the computing device 300. The support circuit 355 may incorporate portions of digital logic that provide various support functions for the processor component 350 (e.g., crosspoint switch, cache controller, processor clock generator, various I/O functions, etc.).

The support circuit 355 may also incorporate portions of digital logic that provide the simulations of various hardware components described with respect to FIG. 1 as being provided by routines executed by the processor component 750. Stated differently, the support circuit 355 may provide one or more of those same simulations using digital logic, instead of software. More specifically, the support circuit 355 may incorporate a bus interface simulator 357, a bus NIC simulator 358 and a network device simulator 359 that may provide the same simulations as the bus interface simulator 747, the bus NIC simulator 748 and the network device simulator 749, respectively, of the controller 700 of FIG. 1.

Figure 3:
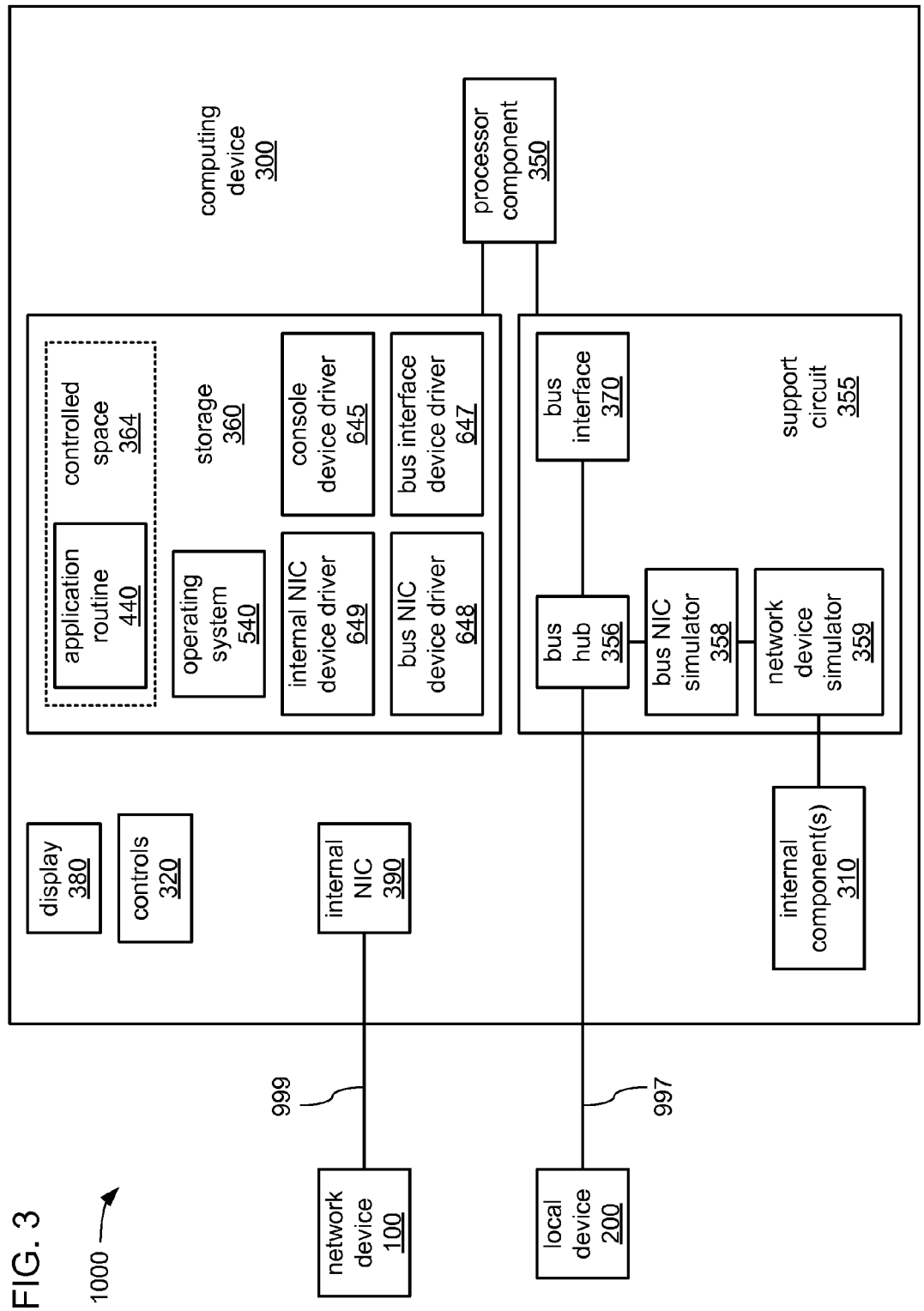
FIG. 3 illustrates another alternate example embodiment of a processing system.

FIG. 3 illustrates a block diagram of another alternate embodiment of the processing system 1000. Instead of incorporating the bus interface simulator 357 of FIG. 2 to simulate a bus interface, in FIG. 3, the support circuit 355 replaces that simulated bus interface with a real bus interface. Mores specifically, the support circuit 355 incorporates the bus interface 370. As depicted, the support circuit 355 may also incorporate a bus hub 356 coupled to the bus interface 370 to split the peripheral bus emanating from the bus interface 370 into two peripheral buses, one of which may be the peripheral bus 997 by which the local device 200 may be coupled to the computing device 300, and the other of which may be another peripheral bus to couple the bus NIC simulator 358 to the bus hub 356. Thus, in the embodiment of the support circuit 355, the bus NIC simulator 358 may include digital logic that may be coupled to a real peripheral bus (e.g., the peripheral bus 356) such that the bus NIC simulator 358 simulates a bus NIC as being present on that real peripheral bus.

It should be noted that such double use of the bus interface 370 in FIG. 3 may be based on the presumption that the type of bus emanating from the bus interface 370 and the type of bus simulated by the bus interface simulator 357 of FIG. 2 are the substantially the same type of peripheral bus. As a result, the bus interface driver 647 may also be used in conjunction with the bus interface 370 in exchanges of data to and/or from each of the local device 200 and the simulated bus NIC provided by the bus NIC simulator 358.

Figure 4:
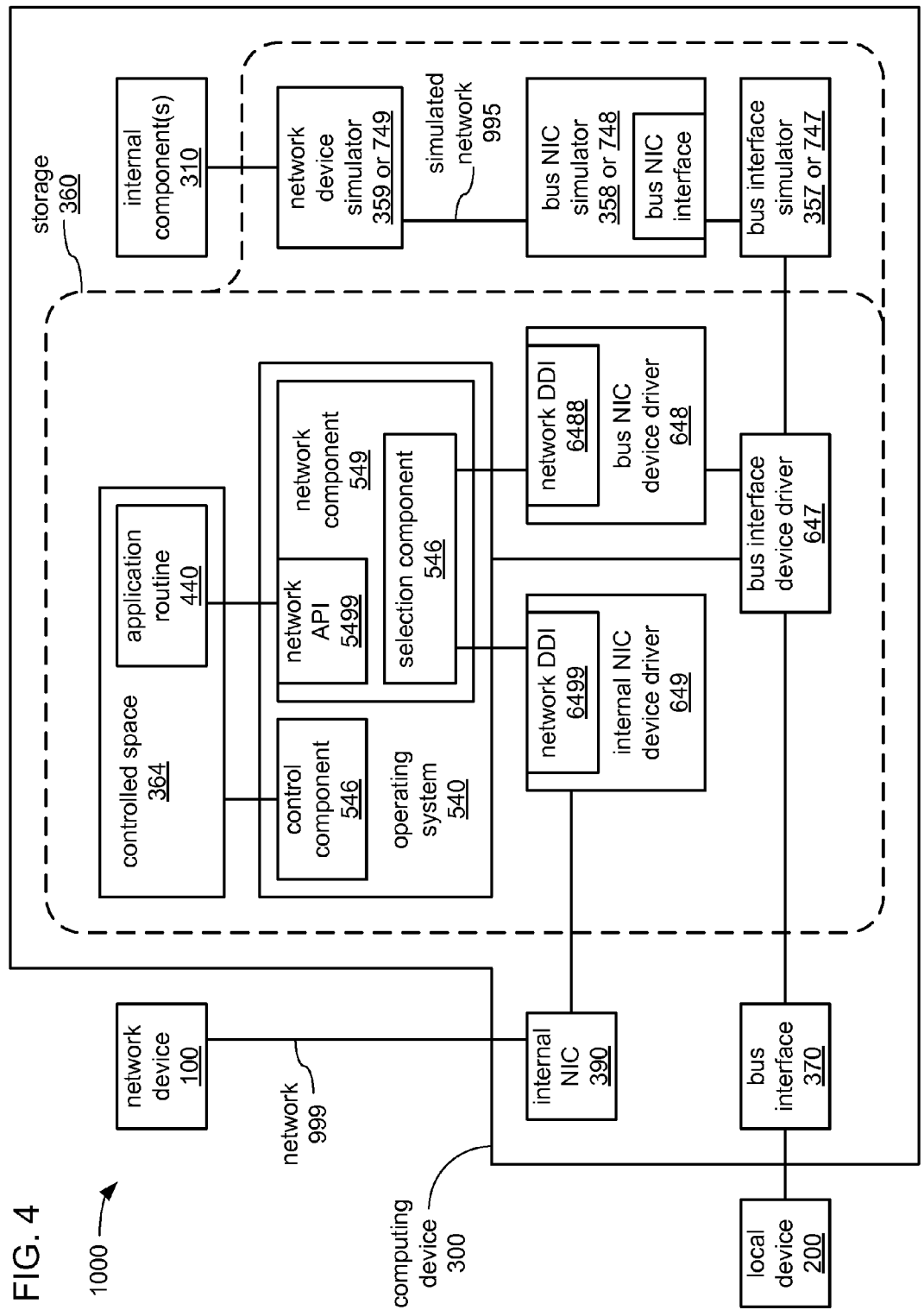
FIG. 4 illustrates an example embodiment of accessing internal component(s) of a computing device of a processing system.

FIG. 4 illustrates an example embodiment of accessing the internal component(s) 310 from the application routine 440 in greater detail. More specifically, aspects of the manner in which the application routine 440 communicates with the internal component(s) 310 as a network device are presented. As depicted, the simulations of a bus interface, a bus NIC and a network device discussed above may be provided either by a combination of the bus interface simulator 747, the bus NIC simulator 748 and the network device simulator 749 of the controller 700 of FIG. 1, or by a combination of the bus interface simulator 357, the bus NIC simulator 358 and the network device simulator 359 of the support circuit 355 of FIG. 2. As also depicted, the simulated bus NIC and the simulated network device may be caused to have simulated exchanges of packets through a simulated network 995. It should be noted that just as the real network 999 may be any of a variety of types of wired or wireless network employing any of a variety of protocols and/or types of signaling, the simulated network 995 may be simulated as being any of a variety of types of wired or wireless network employing any of a variety of protocols and/or types of signaling. Thus, just as the real network 999 may be a wireless personal area network (PAN), a wired or wireless local area network (LAN), a wired or wireless network extending through one or more buildings, or the Internet, the simulated network 995 may simulated be any of such a wide variety of types of network.

As also depicted, the operating system 540 may include a control component 546 that may define the controlled space 364 within which the application routine 440 is stored and executed. In some embodiments, the controlled space 364 may be a form of virtual machine environment and the application routine 440 may be written in high level programming language intended to be interpreted and executed within such a VM, such as Java™ currently offered by Oracle Corporation of Redwood Shores, Calif.

As further depicted, the operating system 540 may include a network component 549 that makes available a network API 5499 to the application routine 440, thereby enabling the application routine 440 to engage in communications with devices on one or more networks coupled to the computing device 300. The network component 549 may also include a selection component to select from among more than one network to which to direct network traffic emanating from the application routine 440 and/or other routines executed within the computing device 300. More specifically, and as previously discussed, the various characteristics of the network traffic in which the application routine 440 may become involved may be analyzed to determine whether to direct that network traffic to the network 999 through the internal NIC 390 and the internal NIC device driver 649, or to the simulated network 995 through the simulated bus NIC provided by either of the bus NIC simulators 358 or 748.

As familiar to those skilled in the art, in networks that employ the Internet Protocol (IP) addressing scheme, each segment of a network may be assigned a subnet defining a range of IP addresses from which each network device coupled to that segment may be assigned an IP address. Thus, the segment of the network 999 to which the internal NIC 390 is coupled may be assigned a subnet. Correspondingly, the segment of the simulated network 995 that is simulated as extending between the simulated bus NIC provided by either of the bus NIC simulators 358 or 748 and the simulated network device provided by either of the network device simulators 359 or 749 may also be assigned a subnet. In some embodiments, the selection component 546 may direct network traffic emanating from the application routine 440 (or from other routines) based on the IP address of the destination of that traffic. To enable the proper operation of such a selection component in a computing device having multiple NICs, one of those NICs may be assigned the role of default gateway. As a result, any network traffic directed to an IP address that does not fall within any subnet of a network segment that any of the multiple NICs of such a computing device are directly coupled to will, by default, be directed to the one NIC that is assigned the role of default gateway. Given that the simulated network 995 is not a real network, and therefore does not actually connect the computing device 300 to any real network device that is actually outside of the computing device 300, it may be deemed undesirable to assign the role of default gateway to the simulated bus NIC provided by either of the bus NIC simulators 358 or 748. Therefore, the internal NIC 390, which is the one real NIC in the computing device 300, may be assigned the role of default gateway to ensure that the network traffic directed towards the simulated network 995 is limited to network traffic exchange with the simulated network device provided by either of the network device simulators 359 or 749.

It should be noted that it is possible for the segment of the network 999 coupled to the internal NIC 390 and for the segment of the simulated network 995 that is simulated as coupled to the simulated bus NIC to be given identical subnets or subnets with overlapping ranges of IP addresses. However, proper functionality of the selection component 546 may require that such a situation be avoided. As familiar to those skilled in the art, it may not be possible to control the subnet given to the segment of the network 999 to which the computing device 300 may be coupled through the internal NIC 390. Therefore, the simulated segment of the simulated network 995 may be given a subnet that is deemed to be relatively unlikely to ever be used as the subnet for the segment of the network 999 coupled to the internal NIC 390 or to be overlapped by the subnet used for that segment of the network 999.

By way of example, one or more IP addresses within a subnet to be assigned to the simulated segment of the simulated network 995 may be reserved with the Internet Assigned Numbers Authority (IANA), a department of the Internet Corporation for Assigned Names and Numbers (ICANN) of Los Angeles, Calif. In other words, the same process for reserving one or more IP addresses for use in providing online services (e.g., a website) could be used to reserve one or more IP addresses for use by the simulated network device provided by either of the network device simulators 359 or 749, and that would be within the subnet assigned to the segment of the simulated network 995 that the simulated network device is simulated as being coupled to. Such reservation of one or more IP addresses would be a reservation of "public" IP address(es) in the sense that they would not be among a handful of particular ranges of IP addresses already reserved for use in private networks, such as those that are normally formed within a home or business among a relatively small number of devices that may be coupled to the Internet via a broadband cable or digital subscriber line (DSL) modem. As familiar to those skilled in the art, it may be relatively likely that the segment of the network 999 to which the internal NIC 390 is coupled may be assigned a subnet that is made up of such private IP addresses, including one that would be assigned to the internal NIC 390. With the segment of the simulated network 995 assigned a subnet made up of public IP addresses reserved with IANA, there may be very little possibility of conflicting subnets and/or IP addresses between the segment of the network 999 to which the internal NIC 390 is coupled and the segment of the simulated network 995 to which is coupled the simulated bus NIC provided by either of the bus NIC simulators 358 or 748.

Therefore, with such subnets assigned, the selection component 546 may direct network traffic that emanates from the application routine 440 based on the IP addresses of destinations of that traffic. Thus, to interact with the internal component(s) 310, the application routine 440 may make network API calls to the network API 5499 provided by the network component 549 to transmit data and/or commands to the internal component(s) 310. In so doing, the application routine may specify a destination IP address selected to be within the range of IP addresses of the subnet assigned to the simulated segment of the simulated network 995 that is simulated as extending between the simulated bus NIC provided by either of the bus NIC simulators 358 or 748 and the simulated network device provided by either of the network device simulators 359 or 749.

The selection component 546 may analyze the specified destination IP address, and may direct the transmitted data and/or commands to the bus NIC device driver 648 as part of directing the transmitted data and/or commands towards the simulated bus NIC provided by either of the bus NIC simulators 358 or 748. In so doing, the network component 549 may convert the network API calls received from the application routine 440 into network device driver interface (DDI) calls to convey the data and/or commands to a network device driver as packets. More precisely, the network component 549 may implement a network stack (e.g., TCP/IP) such that the network component 549 may fragment data from the application routine 440 into smaller pieces and place those pieces into separate packets that each include a header providing various pieces of information for use in routing that packet (e.g., a TCP/UDP or other header, an IP header, and an Ethernet or other media-specific header). The selection component 546 may make those network DDI calls conveying those packets to a network DDI 6488 of the bus NIC device driver 648, instead of to a corresponding network DDI 6499 of the internal NIC device driver 649.

In response to receiving those network DDI calls, the bus NIC device driver 648 may cooperate with the bus interface device driver 647 to relay the data and/or commands originally transmitted by the application routine 440 to the simulated bus interface provided by either of the bus interface simulators 357 or 747, and may include indications that the destination of the data and/or commands is a network device at the specified network address. In turn, the bus interface simulator 357 or 747 may relay the data and/or commands to the bus NIC simulator 358 or 748. In so doing, the bus interface simulator 357 or 747 may present various expected behaviors to the bus interface device driver 647 consistent with a bus interface accepting the data and/or commands and relaying the data and/or commands to a bus NIC coupled to that bus interface by a peripheral bus. Again, due to the increasingly wide use of USB as a peripheral bus and due to the growing acceptance of RNDIS as a specification for a NIC able to be coupled to a computing device via USB, the bus NIC simulator 358 or 748 may simulate a USB bus NIC conforming to RNDIS. In turn, the bus interface simulator 357 or 747 may present the bus interface device driver with various behaviors consistent with a RNDIS-compliant USB bus NIC.

Upon receiving the data and/or commands from the bus interface simulator 357 or 747, the bus NIC simulator 358 or 748 may relay the data and/or commands to the network device simulator 359 or 749 via the simulated network 995. In so doing, the bus NIC simulator 358 or 748 may cooperate with the bus interface simulator 357 or 747 to present various expected behaviors to the bus interface device driver 647 consistent with a bus interface receiving indications of a bus NIC coupled thereto successfully relaying the data and/or commands to a network device coupled to the bus NIC via a network. Upon receiving the data and/or command from the bus NIC simulator 358 or 748, the network device simulator 359 or 749 may convert the format(s) of the data and/or commands to be compatible with the internal component(s) 310, thereby completing the sending of the data and/or commands thereto from the application routine 440.

To correspondingly interact with the application routine 440, the internal component(s) 310 may transmit data and/or commands to the network device simulator 359 or 749 to relay onward to the application routine 440. Upon receiving the data and/or commands, the network device simulator 359 or 749 may then relay the data and/or commands to the bus NIC simulator 358 or 748 via the simulated network 995. In receiving the data and/or commands, the bus NIC simulator 358 or 748 may cooperate with the bus interface simulator 357 or 747 to present various expected behaviors to the bus interface device driver 647 consistent with a bus NIC that is coupled to a bus interface and that is receiving data and/or commands from a network device to which that bus NIC is coupled via network.

In turn, the bus NIC simulator 358 or 748 may relay the data and/or commands to the bus interface simulator 357 or 747. In so doing, the bus NIC simulator 358 or 748 may cooperate with the bus interface simulator 357 or 747 to present various expected behaviors to the bus interface device driver 647 consistent with a bus interface receiving data and/or commands from a bus NIC coupled to that bus interface by a peripheral bus. Upon receiving the data and/or commands, the bus interface simulator 357 or 747 may relay the data and/or commands to the bus interface device driver 647. Upon receiving the data and/or commands from the simulated bus interface provided by the bus interface simulator 357 or 747, the bus interface device driver 647 may cooperate with the bus NIC device driver 648 to relay the data and/or commands to the network component 549. In turn, the network component 549 may relay the data and/or commands to the application routine 440.

As familiar to those skilled in the art, with the assignment of a subnet specifying a range of IP addresses to a segment of a network, each device on that segment of that network may be assigned a separate IP address within that range. Thus, along with the simulated segment of the simulated network 995 being assigned a subnet, separate IP addresses within the range of IP addresses of that subnet may be assigned to the simulated bus NIC provided by either of the bus NIC simulators 358 or 748 and to the simulated network device provided by either of the network device simulators 359 or 749. Therefore, even though the simulated network 995 may have no physical existence whatsoever, there would still be distinct IP addresses for both source and destination for transfers of commands and/or data that are conveyed in either direction therethrough. In other words, each of the simulated bus NIC and the simulated network device would serve as either the source or the destination for the simulated transfer of a packet conveying commands and/or data through the simulated network 995.

Figure 5:
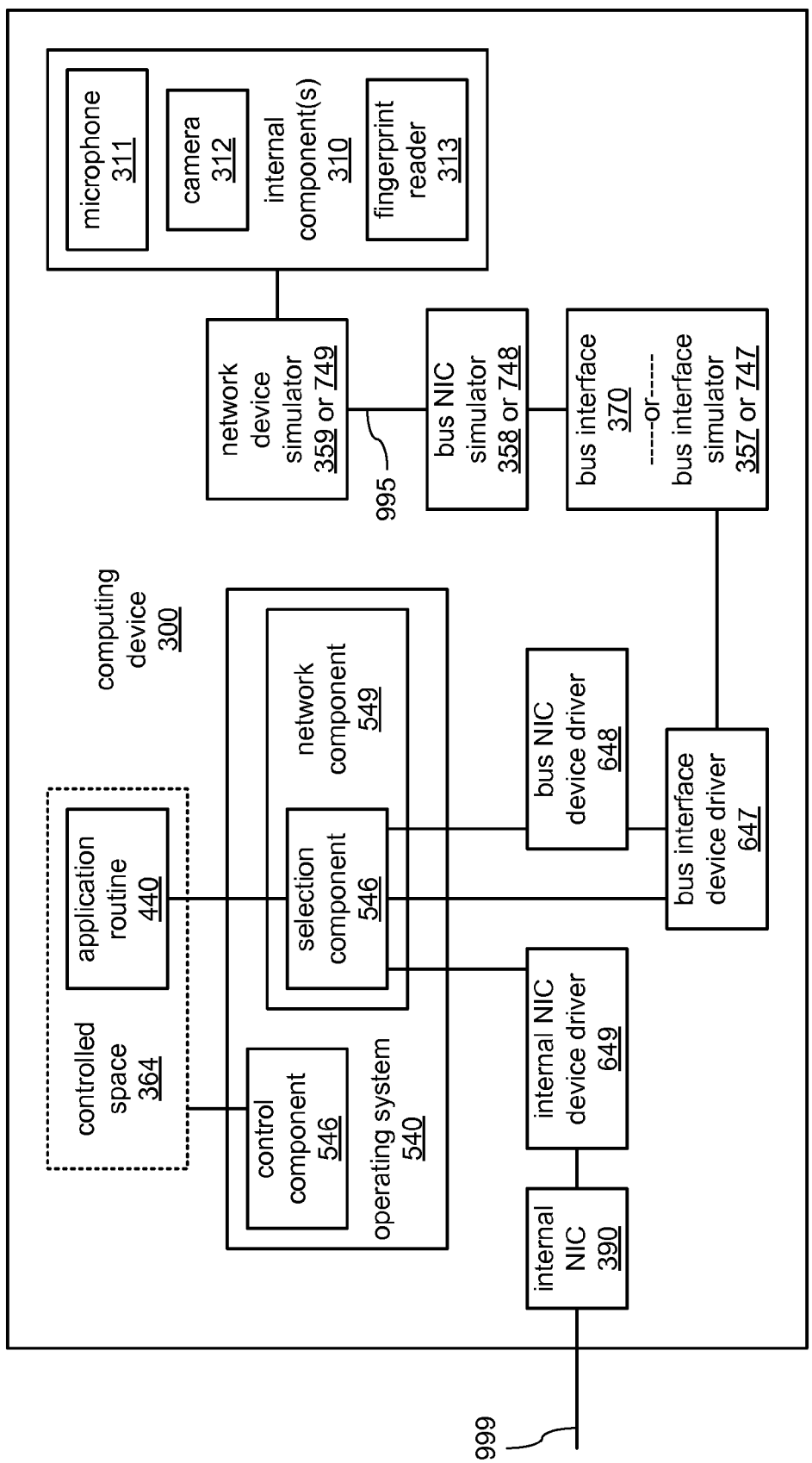
FIG. 5 illustrates an example embodiment of accessing internal components employed to control access to a computing device.

FIG. 5 illustrates a block diagram of an example embodiment of the processing system 1000 in which the internal component(s) 310 of the computing device 300 include one or more devices employed to control access to the computing device 300 by an operator. More specifically, the internal component(s) 310 may incorporate one or more of a microphone 311, a camera 312 and a fingerprint reader 313.

In this example embodiment, the application routine 440 may include instructions causing the processor component 350 to employ the internal component(s) 310 to verify the identity of a person seeking to operate the computing device 300. By way of example, the microphone 311 may be accessed from the application routine 440 to capture voice sounds of the operator as part of employing voice-based identification. Alternatively or additionally, the camera 312 may be accessed from the application routine 440 to capture an image of the face of the operator as part of employing facial recognition. Also alternatively or additionally, the fingerprint reader 313 may be accessed from the application routine 440 to capture an image of a fingerprint of the operator as part of employing fingerprint identification.

Given that the various depicted ones of the internal component(s) capture and then provide biometric data, the simulated network device provided by the network device simulator 359 or 749 may employ the FTP protocol. Accordingly, the network device simulator 359 or 749 may present the internal component(s) 310 as a single network storage device at a single IP address in which is maintained one or more files representing a voice captured by the microphone 311, an image of a face captured by the camera 312 and/or an image of a fingerprint captured by the fingerprint reader 313. Alternatively, the network device simulator 359 or 749 may present separate ones of the microphone 311, the camera 312 and/or the fingerprint reader 313 as separate network storage devices that each have a different IP address. Such use of different IP addresses may be deemed desirable to enable the application routine 440 to select which one(s) of the microphone 311, the camera 312 and/or the 313 to retrieve such data from.

Figure 6:
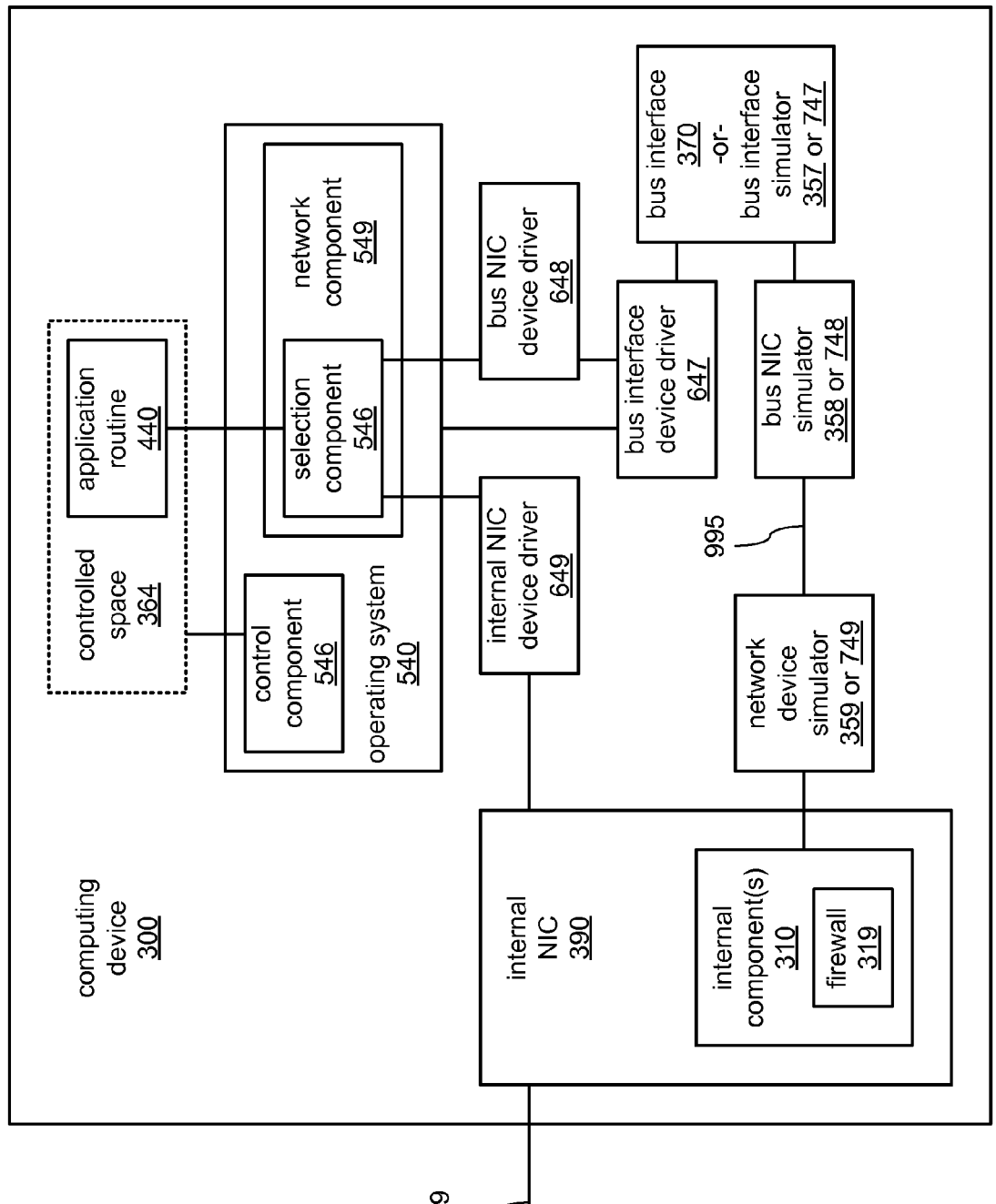
FIG. 6 illustrates an example embodiment of accessing internal components that include a firewall incorporated into a computing device.

FIG. 6 illustrates a block diagram of an example embodiment of the processing system 1000 in which the internal component(s) 310 of the computing device 300 include a firewall 319 that maybe incorporated into or otherwise coupled to the internal NIC 390. The firewall 319 may enforce restrictions on accesses made by an operator of the computing device 300 to other devices on the network 999. Alternatively or additionally, the firewall 319 may inspect packets of data and/or executable instructions received from a device on the network 999 through the NIC 390 for indications of malicious software.

In this example embodiment, the application routine 440 may include instructions causing the processor component 350 to access the firewall 319 of the internal component(s) 310 to configure network various access rules, packet inspection settings, etc. Given the often complex nature of the configuration options typically afforded by a firewall, the simulated network device provided by the network device simulator 359 or 749 may act as a web server providing one or more webpages of configuration options through the HTTP or HTTPS protocol. Accordingly, the network device simulator 359 or 749 may present such a web server for the firewall 319 at a particular IP address that may be used by the application routine 440 to access it.

Figure 7:
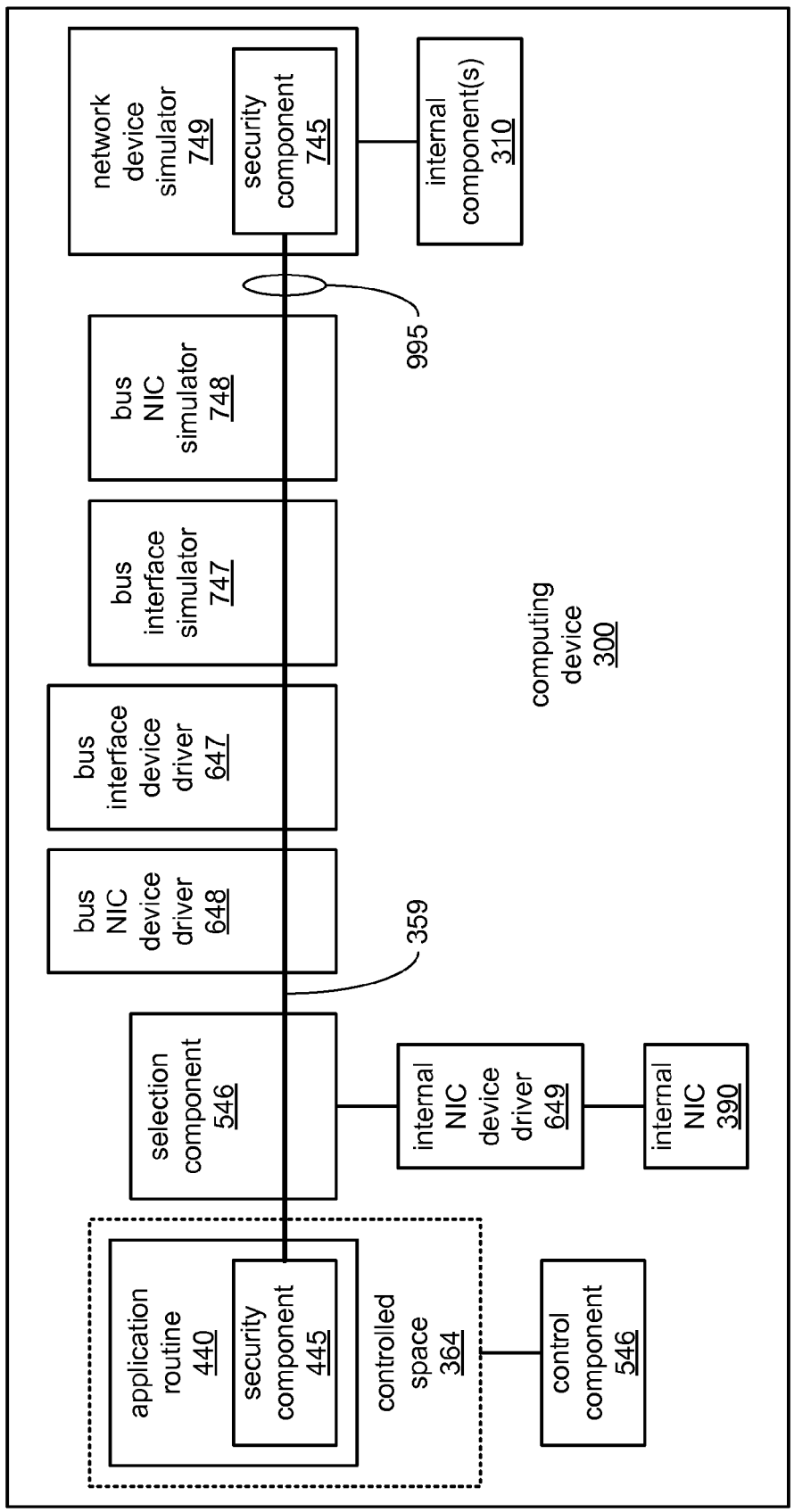
FIG. 7 illustrates an example embodiment of forming a secure pipeline to access internal component(s) of a computing device of a processing system.

FIG. 7 illustrates a block diagram of an example embodiment of the processing system 1000 in which a secure pipeline 359 is formed between at least the application routine 440 and the network device simulator 749 of the controller 700. As depicted, the application routine 440 may incorporate a security component 445, and correspondingly, the network device simulator 749 may incorporate a security component 745. However, it should be noted that the security component 745 may be incorporated into the internal component(s) 310, instead of into the network device simulator 749.

In some embodiments, the operating environment within the controller 700 may be substantially isolated from other portions of the computing device 300, including the operating environment provided by the processor component 300 and the operating system 540. By way of example, the entirety of the storage 760 may be inaccessible to the processor component 350 such that no routine executed by the processor component 350 is able to access any part of the storage 760. Thus, the controller 700 may be deemed to provide a trusted operating environment such that the bus interface simulator 747, the network device simulator 748 and the network device simulator 749 may be securely executed by the processor component 750. However, the operating environment provided by the processor component 350 and the operating system 540 may not be deemed to be as trustworthy. More particularly, although various portions of the storage 360, such as the controlled space 364 may afford some degree of trustworthiness due to enforcement of restrictions on access thereto, concerns may persist about exchanging data between the controlled space 364 and the operating environment of the controller 700.

To address such concerns, the security components 445 and 745 may exchange security credentials such as, and not limited to, public and/or private keys, hashes, digital signatures formed with public or private keys, etc. Each of the security components 445 and 745 may verify security credentials received from the other, and presuming that such verification is successful, the security components 445 and 745 may cooperate to instantiate the secure pipeline 359 that extends directly from the application routine 440, through the operating system 540, through the bus NIC device driver 648 and/or the bus interface device driver 647, through the bus interface simulator 747 and the bus NIC simulator 748, and to the network device simulator 749 within the operating environment of the controller 700. In some embodiments, this may be done in a manner conforming to a version of the specifications for either Socket Layer Security (SLS) or Transfer Layer Security (TLS), both of which are frequently used in networks to secure the exchange of data.

In various embodiments, the storages 360 and 760 may each be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the internal network interface controller 390 may implement an interface to the network 999 that may employ any of a wide variety of signaling technologies enabling these computing devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 8:
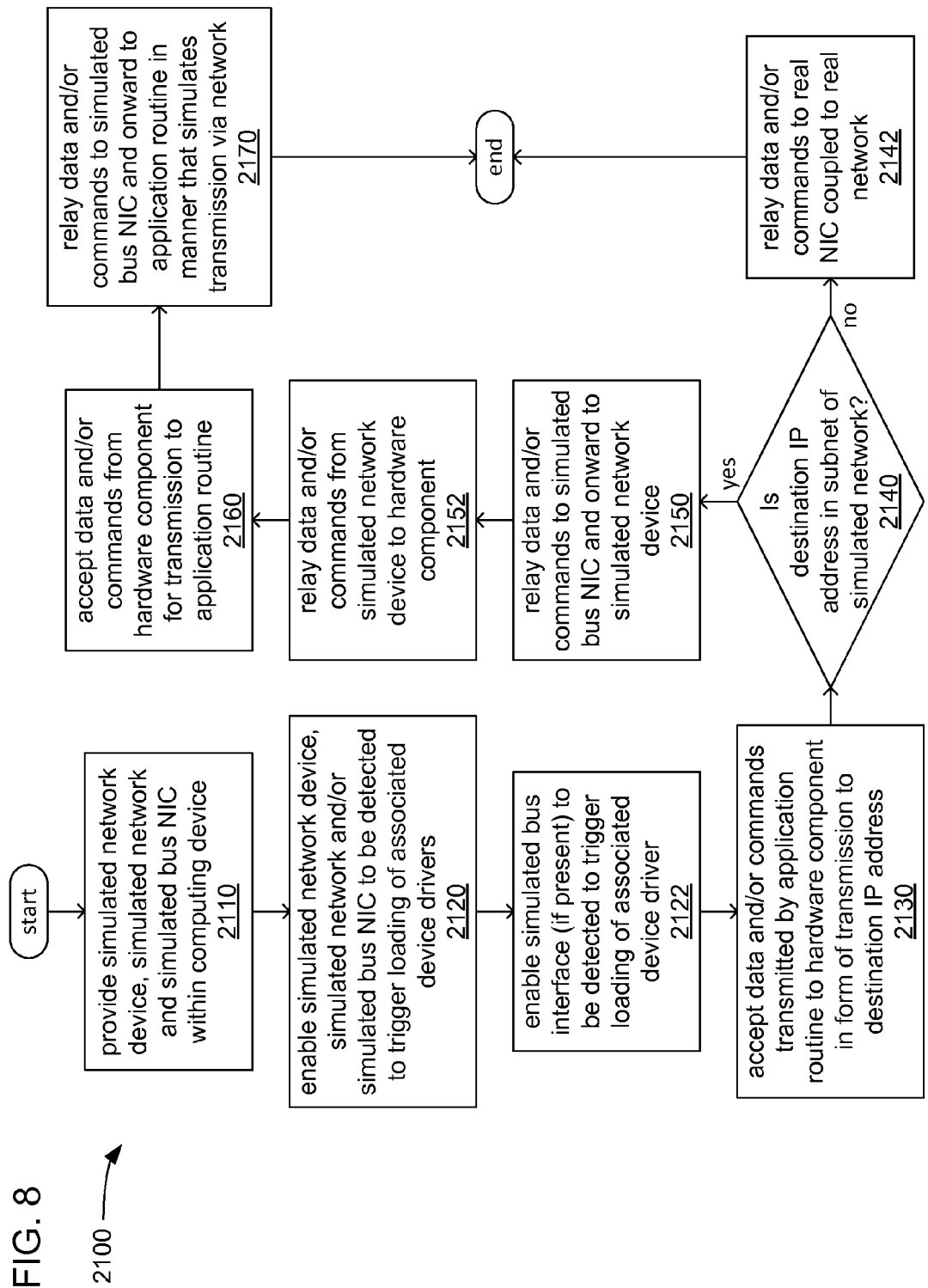
FIGS. 8 and 9 each illustrate a logic flow according to an embodiment.

FIG. 8 illustrates one embodiment of a logic flow 2100. The logic flow 2100 may be representative of some or all of the operations executed by one or more embodiments described herein. More specifically, the logic flow 2100 may illustrate operations performed by the controller processor component 750 and/or the main processor component 350 in executing one or more of the bus interface simulator 747, the bus NIC simulator 748, the network device simulator 749 and the operating system 540, and/or performed by other component(s) of at least the controller 700 and/or the support circuit 355 of the computing device 300.

At 2110, a controller processor component of a controller of a computing device (e.g., the controller processor component 750 of the controller 700 of the computing device 300) executes one or more simulation routines to provide simulations of a network device, a network bus NIC and a network that extends therebetween. However, it should be noted throughout the discussion of the logic flow 2100 that as previously discussed, such simulations may alternatively be provided by digital logic circuits making up one or more ICs (e.g., the support circuit 355). As part of providing these simulations, there may also be a simulation of a DHCP service to assign an IP address to each of the simulations of the network device and the network bus NIC on the simulated network that extends between them.

At 2120, the controller processor component may enable the simulated network device and/or the simulated bus NIC to be detected by routine(s) executed by a main processor component of the computing device (e.g., the main processor component 350) to identify what components are present within the computing device by retrieving values from configuration registers and/or providing queries for identifying information to each such component. At 2130, the controller processor component may enable a simulated bus interface to be detected in embodiments in which there is a simulated bus interface provided by the controller processor component and/or by digital logic circuits. As previously discussed, such efforts at identifying components may be part of an effort by the main processor component to determine what device drivers are to be loaded and executed by the main processor component to support other components of the computing device.

At 2140, the controller processor component may accept data and/or commands from an application routine (e.g., the application routine 440) as part of executing an operating system (e.g., the operating system 540), and the data and/or commands may be provided by the application routine in a form for transmission to a destination IP address of the simulated network device associated with the hardware component. Again, the simulation of the network device on the simulated network may provide the hardware component with the appearance of being a network device, thereby enabling exchanges of data and/or commands therewith as exchanges through a network.

At 2150, the main processor component checks the destination IP address falls within the subnet assigned to the simulated network to which the simulated network device is simulated as being coupled. If the destination IP address does not fall within that subnet, then the main processor component may direct the data and/or commands to a real network coupled to a real NIC of the computing device at 2142.

However, if the destination IP address does fall within that subnet associated with the simulated network, then the main processor component may relay the data and/or commands to the simulated bus NIC provided by the controller processor at 2150, and upon receipt thereof by the controller processor component at the simulated bus NIC, the controller processor component may relay the data and/or the commands onward to the simulated network device. In turn, at 2152, upon receiving the data and/or commands at the simulation network device, the processor component may further relay the data and/or commands to the hardware component, thereby completing the transmission of the data and/or commands to the hardware component.

Possibly as a response to receiving the data and/or commands transmitted by the application routine, the hardware component may itself transmit data and/or commands back to the network device simulation provided by the controller processor component at 2160. At 2170, the controller processor component may relay that data and/or commands from the simulated network device to the simulated bus NIC and onward to enable the main processor component to relay the data and/or commands all the way back to the application routine as part of executing at least the operating system.

Figure 9:
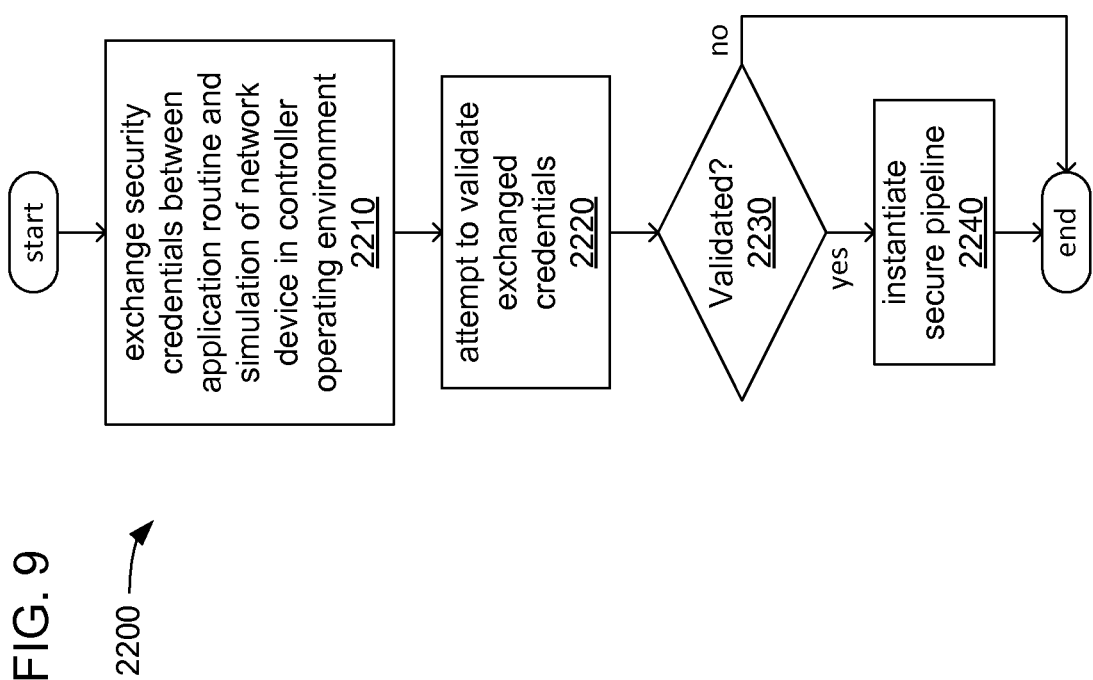

FIG. 9 illustrates one embodiment of a logic flow 2200. The logic flow 2200 may be representative of some or all of the operations executed by one or more embodiments described herein. More specifically, the logic flow 2200 may illustrate operations performed by the controller processor component 750 and/or the main processor component 350 in executing one or more of the bus interface simulator 747, the bus NIC simulator 748, the network device simulator 749 and the operating system 540, and/or performed by other component(s) of at least the controller 700 and/or the support circuit 355 of the computing device 300.

At 2210, the main processor component, as part of executing a security component of an application routine (e.g., the main processor component 350 and the security routine 445 of the application routine 440), may exchange one or more security credentials with the controller processor component executing a security component of a routine for simulating a network device (e.g., the controller processor component and the security component 745 of the network device simulator 749). At 2220, each of the processor components may attempt to validate whatever security credentials each has received.

At 2230, if such validation was successful for all exchanged security credentials, then the two processor components may cooperate to instantiate a secure pipeline extending between the application routine and the network device simulator at 2240. As has been discussed, in other embodiments, the security pipeline may extend only to the simulated bus interface on the basis of the all of the simulations being performed by the same controller processor component within the same trusted operating environment of the controller.

Figure 10:
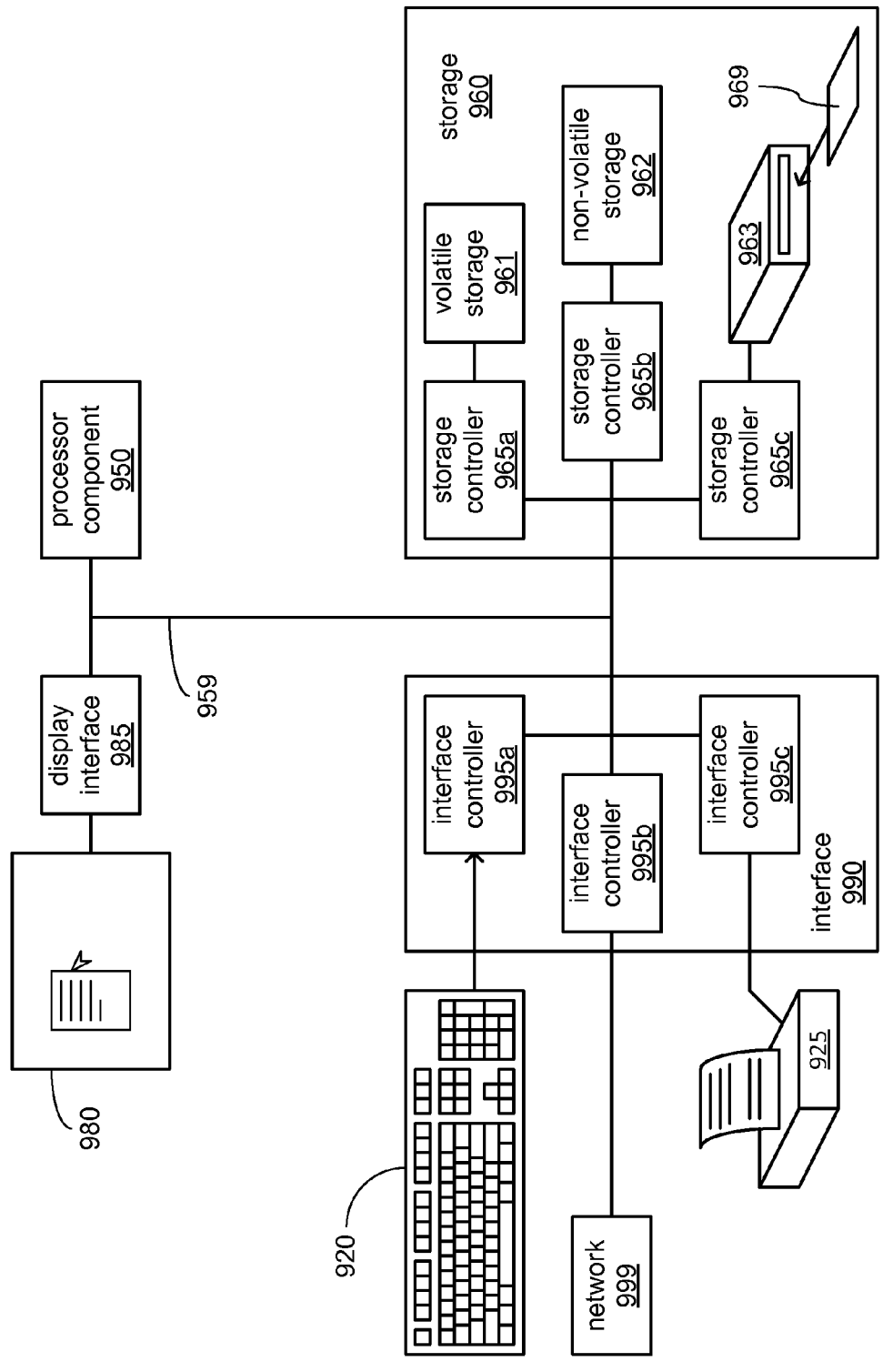
FIG. 10 illustrates a processing architecture according to an embodiment.

FIG. 10 illustrates an embodiment of an exemplary processing architecture 3000 suitable for implementing various embodiments as previously described. More specifically, the processing architecture 3000 (or variants thereof) may be implemented as part of one or more of the computing devices 100, 300, 500 or 700, and/or as part of the controller 600. It should be noted that components of the processing architecture 3000 are given reference numbers in which the last two digits correspond to the last two digits of reference numbers of at least some of the components earlier depicted and described as part of the computing devices 100, 300, 500 and 700, as well as the controller 600. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, a software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device includes at least a processor component 950, a storage 960, an interface 990 to other devices, and a coupling 959. As will be explained, depending on various aspects of a computing device implementing the processing architecture 3000, including its intended use and/or conditions of use, such a computing device may further include additional components, such as without limitation, a display interface 985.

The coupling 959 includes one or more buses, point-to-point interconnects, transceivers, buffers, crosspoint switches, and/or other conductors and/or logic that communicatively couples at least the processor component 950 to the storage 960. Coupling 959 may further couple the processor component 950 to one or more of the interface 990, the audio subsystem 970 and the display interface 985 (depending on which of these and/or other components are also present). With the processor component 950 being so coupled by couplings 959, the processor component 950 is able to perform the various ones of the tasks described at length, above, for whichever one(s) of the aforedescribed computing devices implement the processing architecture 3000. Coupling 959 may be implemented with any of a variety of technologies or combinations of technologies by which signals are optically and/or electrically conveyed. Further, at least portions of couplings 959 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to the processor components 550 and 650) may include any of a wide variety of commercially available processors, employing any of a wide variety of technologies and implemented with one or more cores physically combined in any of a number of ways.

As previously discussed, the storage 960 (corresponding to the storages 560 and 660) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly including multiple distinct types of storage is in recognition of the commonplace use of more than one type of storage device in computing devices in which one type provides relatively rapid reading and writing capabilities enabling more rapid manipulation of data by the processor component 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 959 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 959 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 959 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data.

Thus, a routine including a sequence of instructions to be executed by the processor component 950 may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (possibly corresponding to the interface 590) may employ any of a variety of signaling technologies corresponding to any of a variety of communications technologies that may be employed to communicatively couple a computing device to one or more other devices. Again, one or both of various forms of wired or wireless signaling may be employed to enable the processor component 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network made up of one or more links, smaller networks, or perhaps the Internet). The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, a microphone to monitor sounds of persons to accept commands and/or data signaled by those persons via voice or other sounds they may make, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a computing device is communicatively coupled to (or perhaps, actually incorporates) a display (e.g., the depicted example display 980), such a computing device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

In Example 1, an apparatus includes a processor component of a computing device; a network device simulator coupled to a hardware component of the computing device, and to provide a simulated network device; and a bus network interface controller (NIC) simulator to provide a simulated bus NIC, the bus NIC simulator and the network device simulator to present the hardware component to the processor component as the simulated network device accessible to the processor component through at least the simulated bus NIC and a simulated network that couples the simulated bus NIC to the simulated network device.

In Example 2, which includes the subject matter of Example 1, the apparatus may include a bus interface simulator coupled to the processor component to provide a simulated bus interface, and the bus interface simulator and the bus NIC simulator may present the hardware component to the processor component as the simulated network device accessible to the processor component through the simulated bus interface, a simulated peripheral bus that couples the simulated bus interface to the simulated bus NIC, the simulated bus NIC and the simulated network.

In Example 3, which includes the subject matter of any of Examples 1-2, the apparatus may include a controller that couples the hardware component to the processor component, and the controller may include a controller processor component to execute instructions to provide at least one of the simulated bus interface, the simulated bus NIC or the simulated network device.

In Example 4, which includes the subject matter of any of Examples 1-3, the apparatus may include a support circuit that couples the hardware component to the processor component, and the support circuit may include circuitry to implement at least one of the simulated bus interface, the simulated bus NIC or the simulated network device.

In Example 5, which includes the subject matter of any of Examples 1-4, the apparatus may include a bus interface coupled to the processor component and to a peripheral bus, and the bus interface and the bus NIC simulator may cooperate to present the hardware component to the processor component as the simulated network device accessible to the processor component through the bus interface, the peripheral bus, the simulated bus NIC and the simulated network.

In Example 6, which includes the subject matter of any of Examples 1-5, the apparatus may include a bus hub interposed between the bus interface and the simulated bus NIC to share the peripheral bus with an external device positioned externally of the computing device.

In Example 7, which includes the subject matter of any of Examples 1-6, the apparatus may include an application routine, an operating system to provide the application routine with a network applications programming interface (API) to enable the application routine to communicate with the hardware component as the simulated network device through the operating system, and a bus NIC device driver to enable the operating system to communicate with the simulated bus NIC.

In Example 8, which includes the subject matter of any of Examples 1-7, the apparatus may include a bus interface device driver to cooperate with the bus NIC device driver to enable the operating system to communicate with the simulated bus NIC through one of a bus interface and a simulated bus interface.

In Example 9, which includes the subject matter of any of Examples 1-8, the operating system may include a selection component to direct network traffic emanating from the application routine to one of the simulated network and a network coupled to the computing device through an internal NIC of the computing device based on a comparison of a destination IP address specified in the network traffic to a subnet associated with the simulated network.

In Example 10, which includes the subject matter of any of Examples 1-9, the application routine may use biometric data captured by the hardware component to control access to the computing device, and the hardware component may include at least one of a microphone to capture a voice of an operator of the computing device, a camera to capture an image of a face of the operator or a fingerprint reader to capture an image of a finger print of the operator.

In Example 11, which includes the subject matter of any of Examples 1-10, the apparatus may include an internal NIC to couple the computing device to a network, and the hardware component may include a component of a firewall associated with the internal NIC.

In Example 12, which includes the subject matter of any of Examples 1-11, the simulated network device to provide a webpage to enable configuration of the firewall, and the application routine to operate a display to visually present the webpage.

In Example 13, an apparatus includes a processor component of a computing device, a bus interface simulator coupled to the processor component to provide a simulated bus interface, and a bus network interface controller (NIC) simulator to provide a simulated bus NIC; and the bus NIC simulator and the bus interface simulator may present a hardware component of the computing device to the processor component as a simulated network device accessible to the processor component through at least the simulated bus interface, the simulated bus NIC and a simulated peripheral bus that couples simulated bus NIC to the simulated bus interface.

In Example 14, which includes the subject matter of Example 13, the apparatus may include a network device simulator coupled to hardware component and to provide the simulated network device, and the bus interface simulator and the bus NIC simulator may present the hardware component to processor component as the simulated network device accessible to the processor component through the simulated bus interface, the simulated peripheral bus that couples the simulated bus interface to the simulated bus NIC, the simulated bus NIC and a simulated network.

In Example 15, which includes the subject matter of any of Examples 13-14, the apparatus may include a controller that couples the hardware component to the processor component, and the controller may include a controller processor component to execute instructions to provide at least one of the simulated bus interface, the simulated bus NIC or the simulated network device.

In Example 16, which includes the subject matter of any of Examples 13-15, the apparatus may include a support circuit that couples the hardware component to the processor component, and the support circuit may include circuitry to implement at least one of the simulated bus interface, the simulated bus NIC or the simulated network device.

In Example 17, which includes the subject matter of any of Examples 13-16, the apparatus may include an application routine; an operating system to provide the application routine with a network applications programming interface (API) to enable the application routine to communicate with the hardware component as the simulated network device through the operating system; a bus NIC device driver to enable the operating system to communicate with the simulated bus NIC; and a bus interface device driver to cooperate with the bus NIC device driver to enable the operating system to communicate with the simulated bus NIC through the simulated bus interface.

In Example 18, which includes the subject matter of any of Examples 13-17, the operating system may include a selection component to direct network traffic emanating from the application routine to one of the simulated network and a network coupled to the computing device through an internal NIC of the computing device based on a comparison of a destination IP address specified in the network traffic to a subnet associated with the simulated network.

In Example 19, which includes the subject matter of any of Examples 13-18, the application routine to use biometric data captured by the hardware component to control access to the computing device, and the hardware component may include at least one of a microphone to capture a voice of an operator of the computing device, a camera to capture an image of a face of the operator or a fingerprint reader to capture an image of a finger print of the operator.

In Example 20, which includes the subject matter of any of Examples 13-19, the apparatus may include an internal NIC to couple the computing device to a network, and the hardware component may include a component of a firewall associated with the internal NIC.

In Example 21, which includes the subject matter of any of Examples 13-20, the simulated network device may provide a webpage to enable configuration of the firewall, and the application routine to operate a display to visually present the webpage.

In Example 22, a computing-implemented method includes simulating a network device within a computing device, simulating a bus network interface controller (NIC) within the computing device, and presenting a hardware component of the computing device to a processor component of the computing device as the simulated network device accessible to the processor component through at least the simulated bus NIC and a simulated network that couples the simulated bus NIC to the simulated network device.

In Example 23, which includes the subject matter of Example 22, the method may include simulating a bus interface within the computing device to the processor component; and presenting the hardware component to the processor component as the simulated network device accessible to the processor component through the simulated bus interface, a simulated peripheral bus that couples the simulated bus interface to the simulated bus NIC, the simulated bus NIC and the simulated network.

In Example 24, which includes the subject matter of any of Examples 22-23, the method may include presenting the hardware component to the processor component as the simulated network device accessible to the processor component through a bus interface of the computing device, a peripheral bus of the computing device that couples the bus interface to the simulated bus NIC, the simulated bus NIC and the simulated network.

In Example 25, which includes the subject matter of any of Examples 22-24, the method may include sharing the peripheral bus with an external device positioned externally of the computing device through a bus hub interposed between the bus interface and the simulated bus NIC.

In Example 26, which includes the subject matter of any of Examples 22-25, the method may include providing an application routine of the computing device with a network applications programming interface (API) to enable the application routine to communicate with the hardware component as the simulated network device through an operating system; and providing a device driver interface (DDI) of a bus NIC device driver to enable the operating system to communicate with the simulated bus NIC.

In Example 27, which includes the subject matter of any of Examples 22-26, the method may include comparing a destination IP address specified in network traffic emanating from the application routine to a subnet associated with the simulated network; and directing network traffic emanating from the application routine to one of the simulated network and a network coupled to the computing device through an internal NIC of the computing device based on the comparison.

In Example 28, which includes the subject matter of any of Examples 22-27, the method may include exchanging at least data between the application routine and the simulated network device using a protocol selected from a list consisting of hypertext transfer protocol (HTTP), secure HTTP, file transfer protocol (FTP) and telnet.

In Example 29, which includes the subject matter of any of Examples 22-28, the method may include exchanging a security credential between the application routine and the simulated network device, verifying the security credential, and determining whether to form a secure pipeline between the application routine and the simulated network device based on the verification.

In Example 30, which includes the subject matter of any of Examples 22-29, the method may include operating the hardware component to capture biometric data from an operator of the computing device, and verifying the identity of the operator based on the captured biometric data; the captured biometric data may include at least one of a captured recording of a voice of the operator, a captured image of a face of the operator or a captured image of a fingerprint of the operator; and the hardware component may include at least one of a microphone, a camera or a fingerprint reader.

In Example 31, at least one machine-readable storage medium includes instructions that when executed by a controller processor component, may cause the controller processor component to simulate a network device within a computing device; simulate a bus network interface controller (NIC) within the computing device; and present a hardware component of the computing device to a main processor component of the computing device as the simulated network device accessible to the main processor component through at least the simulated bus NIC and a simulated network that couples the simulated bus NIC to the simulated network device.

In Example 32, which includes the subject matter of Example 31, the controller processor component may be caused to simulate a bus interface within the computing device to the main processor component, and present the hardware component to the main processor component as the simulated network device accessible to the main processor component through the simulated bus interface, a simulated peripheral bus that couples the simulated bus interface to the simulated bus NIC, the simulated bus NIC and the simulated network.

In Example 33, which includes the subject matter of any of Examples 31-32, the controller processor component may be caused to present the hardware component to the main processor component as the simulated network device accessible to the main processor component through a bus interface of the computing device, a peripheral bus of the computing device that couples the bus interface to the simulated bus NIC, the simulated bus NIC and the simulated network.

In Example 34, which includes the subject matter of any of Examples 31-33, the controller processor component may be caused to share the peripheral bus with an external device positioned externally of the computing device through a bus hub interposed between the bus interface and the simulated bus NIC.

In Example 35, which includes the subject matter of any of Examples 31-34, the controller processor component may be caused to provide an application routine of the computing device with a network applications programming interface (API) to enable the application routine to communicate with the hardware component as the simulated network device through an operating system; and provide a device driver interface (DDI) of a bus NIC device driver to enable the operating system to communicate with the simulated bus NIC.

In Example 36, which includes the subject matter of any of Examples 31-35, the controller processor component may be caused to compare a destination IP address specified in network traffic emanating from the application routine to a subnet associated with the simulated network; and direct network traffic emanating from the application routine to one of the simulated network and a network coupled to the computing device through an internal NIC of the computing device based on the comparison.

In Example 37, which includes the subject matter of any of Examples 31-36, the controller processor component may be caused to exchange at least data between the application routine and the simulated network device using a protocol selected from a list consisting of hypertext transfer protocol (HTTP), secure HTTP, file transfer protocol (FTP) and telnet.

In Example 38, which includes the subject matter of any of Examples 31-37, the controller processor component may be caused to exchange a security credential between the application routine and the simulated network device; verify the security credential; and determine whether to form a secure pipeline between the application routine and the simulated network device based on the verification.

In Example 39, which includes the subject matter of any of Examples 31-38, the controller processor component may be caused to operate the hardware component to capture biometric data from an operator of the computing device, and verify the identity of the operator based on the captured biometric data, the captured biometric data may include at least one of a captured recording of a voice of the operator, a captured image of a face of the operator or a captured image of a fingerprint of the operator; and the hardware component may include at least one of a microphone, a camera or a fingerprint reader.

In Example 40, at least one machine-readable storage medium may include instructions that when executed by a controller processor component, cause the computing device to perform any of the above.

In Example 41, an apparatus may include means for performing any of the above.

The invention claimed is:

1. An apparatus, comprising:
a processor component of a computing device;
a hardware component of the computing device;
a network device simulator to provide:
   a simulated network device to include the hardware component; and
   a simulated network to access the simulated network device;
a bus network interface controller (NIC) simulator to provide a simulated bus NIC to couple the processor component to the simulated network to provide access to the simulated network device through the simulated network; and
a computer-readable storage coupled to the processor component, the computer-readable storage comprising:
   an application routine for execution by the processor component;
   an operating system for execution by the processor component to provide the application routine with a network applications programming interface (API) to enable the application routine to communicate with the hardware component as the simulated network device through the operating system; and
   a bus NIC device driver for execution by the processor component to enable the operating system to communicate with the simulated bus NIC.

2. The apparatus of claim 1, comprising a bus interface simulator to provide a simulated bus interface and a simulated peripheral bus to couple the processor component to the simulated bus NIC.

3. The apparatus of claim 2, comprising a controller coupled to the hardware component and to the processor component, the controller comprising a controller processor component to execute instructions to provide at least one of the simulated bus interface, the simulated bus NIC or the simulated network device.

4. The apparatus of claim 1, comprising a bus interface to couple the processor component to a peripheral bus, the bus NIC simulator to couple the processor component to the simulated network device through the bus interface, the peripheral bus, the simulated bus NIC and the simulated network.

5. The apparatus of claim 4, comprising a bus hub interposed between the bus interface and the simulated bus NIC to share the peripheral bus with an external device positioned externally of the computing device.

6. The apparatus of claim 1, the application routine to use biometric data captured by the hardware component to control access to the computing device, the hardware component comprising at least one of a microphone to capture a voice of an operator of the computing device, a camera to capture an image of a face of the operator or a fingerprint reader to capture an image of a finger print of the operator.

7. An apparatus to provide software support for a hardware feature comprising: a processor component of a computing device; a bus interface simulator to provide a simulated bus interface to couple to the processor component; and a bus network interface controller (NIC) simulator to provide a simulated bus NIC and a simulated peripheral bus, the simulated bus NIC to couple the processor component to a simulated network device through the simulated peripheral bus, the simulated bus NIC, and the simulated bus interface, the simulated network device to include a hardware component of the computing device; and
a computer-readable storage coupled to the processor component, the computer-readable storage comprising:
   an application routine for execution by the processor component;
   an operating system for execution by the processor component to provide the application routine with a network applications programming interface (API) to enable the application routine to communicate with the hardware component as the simulated network device through the operating system; and
   a bus NIC device driver for execution by the processor component to enable the operating system to communicate with the simulated bus NIC.

8. The apparatus of claim 7, comprising:
an application routine for execution by the processor component;
an operating system for execution by the processor component to provide the application routine with a network applications programming interface (API) to enable the application routine to communicate with the hardware component as the simulated network device through the operating system;
a bus NIC device driver for execution by the processor component to enable the operating system to communicate with the simulated bus NIC; and
a bus interface device driver for execution by the processor component to cooperate with the bus NIC device driver to enable the operating system to communicate with the simulated bus NIC through the simulated bus interface.

9. The apparatus of claim 8, the operating system comprising a selection component to direct network traffic emanating from the application routine to one of the simulated network and a network coupled to the computing device through an internal NIC of the computing device based on a comparison of a destination IP address specified in the network traffic to a subnet associated with the simulated network.

10. The apparatus of claim 8, the application routine to use biometric data captured by the hardware component to control access to the computing device, the hardware component comprising at least one of a microphone to capture a voice of an operator of the computing device, a camera to capture an image of a face of the operator or a fingerprint reader to capture an image of a finger print of the operator.

11. The apparatus of claim 7, comprising an internal NIC to couple the computing device to a network, the hardware component comprising a component of a firewall associated with the internal NIC.

12. A computer-implemented method to provide software support for a hardware feature, the method comprising: simulating a network device within a computing device, the simulated network device to include a hardware component of the computing device; simulating a bus network interface controller (NIC); simulating a network; and presenting the simulated network device to include the hardware component to a processor component of the computing device accessible to the processor component through at least the simulated bus NIC and the simulated network; and
    executing an application routine by the processor component;
    executing an operating system by the processor component to provide the application routine with a network applications programming interface (API) to enable the application routine to communicate with the hardware component as the simulated network device through the operating system; and
    executing a bus NIC device driver by the processor component to enable the operating system to communicate with the simulated bus NIC.

13. The computer-implemented method of claim 12, the method comprising:
    simulating a bus interface to couple to the processor component; and
    simulating a peripheral bus to couple to the simulated bus interface and the simulated bus NIC.

14. The computer-implemented method of claim 12, the method comprising:
    providing an application routine of the computing device with a network applications programming interface (API) to enable the application routine to communicate with the hardware component as the simulated network device through an operating system; and
    providing a device driver interface (DDI) of a bus NIC device driver to enable the operating system to communicate with the simulated bus NIC.

15. The computer-implemented method of claim 14, the method comprising:
    comparing a destination IP address specified in network traffic emanating from the application routine to a subnet associated with the simulated network; and
    directing network traffic emanating from the application routine to one of the simulated network and a network coupled to the computing device through an internal NIC of the computing device based on the comparison.

16. The computer-implemented method of claim 14, the method comprising exchanging at least data between the application routine and the simulated network device using a protocol selected from a list consisting of hypertext transfer protocol (HTTP), secure HTTP, file transfer protocol (FTP) and telnet.

17. The computer-implemented method of claim 14, the method comprising:
    exchanging a security credential between the application routine and the simulated network device;
    verifying the security credential; and
    determining whether to form a secure pipeline between the application routine and the simulated network device based on the verification.

18. At least one non-transitory machine-readable storage medium comprising instructions that when executed by a controller processor component, cause the controller processor component to: simulate a network device within a computing device, the simulated network device to include a hardware component of the computing device; simulate a bus network interface controller (NIC); simulate a network; and present the simulated network device to include the hardware component to a processor component of the computing device accessible to the processor component through at least the simulated bus NIC and the simulated network and
    a computer-readable storage coupled to the processor component, the computer-readable storage comprising:
    an application routine for execution by the processor component;
    an operating system for execution by the processor component to provide the application routine with a network applications programming interface (API) to enable the application routine to communicate with the hardware component as the simulated network device through the operating system; and
    a bus NIC device driver for execution by the processor component to enable the operating system to communicate with the simulated bus NIC.

19. The at least one tangible machine-readable storage medium of claim 18, the controller processor component caused to:
    simulate a bus interface to couple to the processor component; and
    simulate a peripheral bus to couple to the simulated bus interface and the simulated bus NIC.

20. The at least one tangible machine-readable storage medium of claim 18, the controller processor component caused to present the hardware component to the main processor component as the simulated network device accessible to the main processor component through a bus interface of the computing device, a peripheral bus of the computing device that couples the bus interface to the simulated bus NIC, the simulated bus NIC and the simulated network.

21. The at least one tangible machine-readable storage medium of claim 20, the controller processor component caused to share the peripheral bus with an external device positioned externally of the computing device through a bus hub interposed between the bus interface and the simulated bus NIC.

22. The at least one tangible machine-readable storage medium of claim 18, the controller processor component caused to:
    provide an application routine of the computing device with a network applications programming interface (API) to enable the application routine to communicate with the hardware component as the simulated network device through an operating system; and
    provide a device driver interface (DDI) of a bus NIC device driver to enable the operating system to communicate with the simulated bus NIC.

23. The at least one tangible machine-readable storage medium of claim 22, the controller processor component caused to:
    exchange a security credential between the application routine and the simulated network device;
    verify the security credential; and
    determine whether to form a secure pipeline between the application routine and the simulated network device based on the verification.

24. The at least one tangible machine-readable storage medium of claim 22, the controller processor component caused to:
    operate the hardware component to capture biometric data from an operator of the computing device; and
    verify the identity of the operator based on the captured biometric data, the captured biometric data comprising at least one of a captured recording of a voice of the operator, a captured image of a face of the operator or a captured image of a fingerprint of the operator, the hardware component comprising at least one of a microphone, a camera or a fingerprint reader.

* * * * *